United States Patent
Liu et al.

(10) Patent No.: US 11,806,639 B2
(45) Date of Patent: Nov. 7, 2023

(54) PRETREATMENT AND PRE-COOLING OF NATURAL GAS BY HIGH PRESSURE COMPRESSION AND EXPANSION

(71) Applicant: ExxonMobil Technology and Engineering Company, Spring, TX (US)

(72) Inventors: Yijun Liu, Spring, TX (US); Fritz Pierre, Jr., Humble, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 609 days.

(21) Appl. No.: 16/851,718

(22) Filed: Apr. 17, 2020

(65) Prior Publication Data

US 2021/0086099 A1    Mar. 25, 2021

Related U.S. Application Data

(60) Provisional application No. 62/902,459, filed on Sep. 19, 2019.

(51) Int. Cl.
 *B01D 1/28* (2006.01)
 *F25J 1/00* (2006.01)
 *F25J 1/02* (2006.01)

(52) U.S. Cl.
 CPC ......... *B01D 1/2856* (2013.01); *B01D 1/2884* (2013.01); *F25J 1/004* (2013.01);
 (Continued)

(58) Field of Classification Search
 CPC ...... B01D 1/2856; B01D 1/2884; F25J 1/004; F25J 1/0055; F25J 1/0212; F25J 1/0231;
 (Continued)

(56) References Cited

U.S. PATENT DOCUMENTS

| | | |
|---|---|---|
| 1,914,337 A | 6/1933 | Belt |
| 1,974,145 A | 9/1934 | Atwell ........................ 183/120 |

(Continued)

FOREIGN PATENT DOCUMENTS

| | | | |
|---|---|---|---|
| CN | 102620523 | 10/2014 | |
| CN | 102628635 | 10/2014 | ................. F25J 3/08 |

(Continued)

OTHER PUBLICATIONS

U.S. Appl. No. 16/410,607, filed May 13, 2019, Liu et al.

(Continued)

*Primary Examiner* — Jenna M Hopkins
(74) *Attorney, Agent, or Firm* — Vorys, Sater, Seymour and Pease LLP

(57) ABSTRACT

A method and apparatus for producing liquefied natural gas. A portion of a natural gas stream is cooled in a heat exchanger and combined with the natural gas stream. Heavy hydrocarbons are removed from the combined natural gas stream, and the resulting separated natural gas stream is partially condensed in the first heat exchanger, with a liquid stream separated therefrom. The natural gas stream is warmed in the first heat exchanger and then is compressed and cooled. The resultant cooled compressed natural gas stream is expanded, thereby forming a chilled natural gas stream that is separated into a refrigerant stream and a non-refrigerant stream. The refrigerant stream recycled to the heat exchanger to be warmed through heat exchange with one or more process streams associated with pretreating the natural gas stream, thereby generating a warmed refrigerant stream. The warmed refrigerant stream and the non-refrigerant stream are liquefied.

11 Claims, 17 Drawing Sheets

(52) U.S. Cl.
CPC ........... *F25J 1/0055* (2013.01); *F25J 1/0212* (2013.01); *F25J 1/0231* (2013.01); *F25J 1/0267* (2013.01); *F25J 1/0279* (2013.01); *F25J 2210/06* (2013.01); *F25J 2220/62* (2013.01); *F25J 2220/64* (2013.01); *F25J 2245/02* (2013.01)

(58) Field of Classification Search
CPC ...... F25J 1/0267; F25J 1/0279; F25J 2210/06; F25J 2220/62; F25J 2220/64; F25J 2245/02; F25J 2230/22; F25J 2240/80; F25J 2270/02; F25J 2270/16; F25J 2290/50; F25J 2290/72; F25J 1/0022; F25J 1/0035; F25J 1/0042; F25J 1/0045; F25J 1/0052; F25J 1/0072; F25J 1/0092; F25J 1/0204; F25J 1/0237; F25J 2215/04; F25J 2230/30; F25J 1/005; F25J 1/0265; F25J 1/0271; F25J 1/0278; F25J 1/0283; F25J 1/0284; F25J 2200/02; F25J 2200/04; F25J 2200/74; F25J 2200/78; F25J 2230/20; F25J 2230/32; F25J 2240/40; F25J 2260/20; F25J 2270/04; F25J 3/0233; F25J 3/0247; F25J 3/0209; F25J 1/0209; F25J 3/08; F25J 3/061; F25J 2200/38; F25J 2220/02; F25J 2260/02; F25J 1/0037; F25J 1/0207; F25J 1/0215; F25J 1/025; F25J 1/0269; F25J 2200/038; F25J 2200/76; F25J 2205/02; F25J 2260/42; F25J 2270/12; F25J 2270/66

See application file for complete search history.

(56) References Cited

U.S. PATENT DOCUMENTS

| | | | | |
|---|---|---|---|---|
| 2,007,271 | A | 7/1935 | Frankl | 62/175.5 |
| 2,011,550 | A | 8/1935 | Hasche | 62/121 |
| 2,321,262 | A | 6/1943 | Taylor | 62/140 |
| 2,475,255 | A | 7/1949 | Rollman | 62/170 |
| 2,537,045 | A | 1/1951 | Garbo | 62/122 |
| 3,014,082 | A | 12/1961 | Woertz, III | 260/676 |
| 3,103,427 | A | 9/1963 | Jennings | 62/39 |
| 3,180,709 | A | 4/1965 | Yendall et al. | 23/210 |
| 3,347,055 | A | 10/1967 | Blanchard et al. | 62/9 |
| 3,370,435 | A | 2/1968 | Arregger | 62/28 |
| 3,400,512 | A | 9/1968 | McKay | 55/69 |
| 3,400,547 | A | 9/1968 | Williams et al. | 62/55 |
| 3,511,058 | A | 5/1970 | Becker | 62/9 |
| 3,724,225 | A | 4/1973 | Mancini et al. | |
| 3,724,226 | A | 4/1973 | Pachaly | 62/39 |
| 3,878,689 | A | 4/1975 | Grenci | 62/9 |
| 4,281,518 | A | 8/1981 | Muller et al. | 62/12 |
| 4,415,345 | A | 11/1983 | Swallow | 62/28 |
| 4,609,388 | A | 9/1986 | Adler et al. | 62/12 |
| 4,669,277 | A | 6/1987 | Goldstein | |
| 4,769,054 | A | 9/1988 | Steigman | 62/12 |
| 4,948,405 | A * | 8/1990 | Thompson | F25J 3/0209 |
| | | | | 62/927 |
| 5,025,860 | A | 6/1991 | Mandrin | 166/267 |
| 5,137,558 | A | 8/1992 | Agrawal | 62/24 |
| 5,139,547 | A | 8/1992 | Agrawal et al. | 62/8 |
| 5,141,543 | A | 8/1992 | Agrawal et al. | 62/8 |
| 5,638,698 | A | 6/1997 | Knight et al. | 62/632 |
| 5,881,569 | A | 3/1999 | Campbell et al. | |
| 5,950,453 | A | 9/1999 | Bowen et al. | 62/612 |
| 6,003,603 | A | 12/1999 | Breivik et al. | 166/357 |
| 6,023,942 | A | 2/2000 | Thomas et al. | |
| 6,082,133 | A | 7/2000 | Barclay et al. | |
| 6,158,242 | A | 12/2000 | Lu | 62/637 |
| 6,295,838 | B1 | 10/2001 | Shah et al. | 62/643 |
| 6,298,688 | B1 | 10/2001 | Brostow et al. | 62/613 |
| 6,308,531 | B1 | 10/2001 | Roberts et al. | |
| 6,412,302 | B1 | 7/2002 | Foglietta | 62/611 |
| 6,662,589 | B1 | 12/2003 | Roberts et al. | 62/425 |
| 6,755,965 | B2 | 6/2004 | Pironti et al. | |
| 6,889,522 | B2 | 5/2005 | Prible et al. | 62/612 |
| 7,143,606 | B2 | 12/2006 | Trainer | 62/611 |
| 7,219,512 | B1 | 5/2007 | Wilding et al. | |
| 7,278,281 | B2 | 10/2007 | Yang et al. | 62/612 |
| 7,386,996 | B2 | 6/2008 | Fredheim et al. | 62/612 |
| 7,520,143 | B2 | 4/2009 | Spilsbury | 62/620 |
| 7,673,476 | B2 | 3/2010 | Whitesell | |
| 7,712,331 | B2 | 5/2010 | Dee et al. | 62/612 |
| 8,079,321 | B2 | 12/2011 | Balasubramanian | 114/74 |
| 8,435,403 | B2 | 5/2013 | Sapper et al. | 208/254 |
| 8,464,289 | B2 | 6/2013 | Pan | 725/34 |
| 8,601,833 | B2 | 12/2013 | Dee et al. | 62/648 |
| 8,616,012 | B2 | 12/2013 | Duerr et al. | 62/89 |
| 8,616,021 | B2 | 12/2013 | Minta | |
| 8,635,885 | B2 * | 1/2014 | Mak | F25J 3/0247 |
| | | | | 62/622 |
| 8,747,520 | B2 | 6/2014 | Bearden et al. | 95/41 |
| 9,016,088 | B2 | 4/2015 | Butts | 62/613 |
| 9,339,752 | B2 | 5/2016 | Reddy et al. | B01D 53/002 |
| 9,435,229 | B2 | 9/2016 | Alekseev et al. | 60/643 |
| 9,439,077 | B2 | 9/2016 | Gupta et al. | H04W 12/12 |
| 9,459,042 | B2 | 10/2016 | Chantant et al. | 62/50.2 |
| 9,810,478 | B2 | 11/2017 | Isaacson et al. | |
| 9,995,521 | B2 | 6/2018 | Mogilevsky | |
| 10,082,331 | B2 | 8/2018 | Evans et al. | |
| 10,267,559 | B2 | 4/2019 | Ducote, Jr. et al. | |
| 10,294,433 | B2 | 5/2019 | Grainger et al. | |
| 2005/0198998 | A1 * | 9/2005 | Lee | F25J 3/0655 |
| | | | | 62/623 |
| 2005/0204774 | A1 * | 9/2005 | Foglietta | F25J 3/0238 |
| | | | | 62/620 |
| 2006/0000615 | A1 | 1/2006 | Choi | 166/352 |
| 2006/0260355 | A1 | 11/2006 | Roberts et al. | |
| 2006/0283207 | A1 * | 12/2006 | Pitman | F25J 3/0209 |
| | | | | 62/620 |
| 2007/0277674 | A1 | 12/2007 | Hirano et al. | 95/290 |
| 2008/0087421 | A1 | 4/2008 | Kaminsky | |
| 2008/0302133 | A1 | 12/2008 | Saysset et al. | |
| 2009/0107174 | A1 | 4/2009 | Ambari et al. | |
| 2009/0173103 | A1 | 7/2009 | Mak | |
| 2009/0217701 | A1 | 9/2009 | Minta et al. | 62/612 |
| 2010/0043488 | A1 * | 2/2010 | Mak | F25J 3/0233 |
| | | | | 62/620 |
| 2010/0192626 | A1 | 8/2010 | Chantant | 62/606 |
| 2010/0206003 | A1 * | 8/2010 | Mak | F25J 3/0242 |
| | | | | 62/630 |
| 2010/0251763 | A1 | 10/2010 | Audun | 62/614 |
| 2011/0036121 | A1 | 2/2011 | Roberts et al. | 62/612 |
| 2011/0126451 | A1 | 6/2011 | Pan et al. | 44/451 |
| 2011/0174017 | A1 | 7/2011 | Victory et al. | |
| 2011/0226012 | A1 | 9/2011 | Johnke et al. | |
| 2011/0259044 | A1 | 10/2011 | Baudat et al. | 62/611 |
| 2012/0036888 | A1 | 2/2012 | Vandor | |
| 2012/0180657 | A1 | 7/2012 | Monereau et al. | |
| 2012/0255325 | A1 | 10/2012 | Prim | |
| 2012/0285196 | A1 | 11/2012 | Flinn et al. | 62/620 |
| 2013/0074541 | A1 | 3/2013 | Kaminsky et al. | 62/601 |
| 2013/0199238 | A1 | 8/2013 | Mock et al. | 62/611 |
| 2013/0213087 | A1 * | 8/2013 | Currence | F25J 3/0233 |
| | | | | 62/621 |
| 2014/0075987 | A1 * | 3/2014 | Mak | F25J 3/0238 |
| | | | | 62/630 |
| 2014/0130542 | A1 | 5/2014 | Brown et al. | 62/612 |
| 2014/0338396 | A1 | 11/2014 | Malik | |
| 2015/0013379 | A1 | 1/2015 | Oelfke | |
| 2015/0285553 | A1 | 10/2015 | Oelfke et al. | 62/611 |
| 2017/0010041 | A1 | 1/2017 | Pierre, Jr. et al. | 62/616 |
| 2017/0016667 | A1 | 1/2017 | Huntington et al. | 62/614 |
| 2017/0016668 | A1 | 1/2017 | Pierre, Jr. et al. | 62/614 |
| 2017/0051970 | A1 * | 2/2017 | Mak | F25J 3/0209 |
| 2017/0122658 | A1 * | 5/2017 | Currence | F25J 3/0209 |
| 2017/0167785 | A1 | 6/2017 | Pierre, Jr. et al. | 62/613 |
| 2017/0167786 | A1 * | 6/2017 | Pierre, Jr. | F25J 1/0037 |
| 2017/0167787 | A1 | 6/2017 | Pierre, Jr. et al. | 62/614 |

(56) References Cited

U.S. PATENT DOCUMENTS

| | | | |
|---|---|---|---|
| 2017/0167788 A1 | 6/2017 | Pierre, Jr. et al. | 62/620 |
| 2017/0336137 A1* | 11/2017 | Mak | F25J 3/0238 |
| 2017/0336139 A1* | 11/2017 | Butts | F25J 3/0233 |
| 2018/0066889 A1 | 3/2018 | Gaskin et al. | |
| 2018/0149425 A1* | 5/2018 | Oneal | C10L 3/10 |
| 2019/0154333 A1* | 5/2019 | Mak | F25J 3/0228 |
| 2019/0271503 A1 | 9/2019 | Terrien et al. | |
| 2019/0376740 A1 | 12/2019 | Liu et al. | |
| 2020/0064064 A1* | 2/2020 | Butts | F25J 3/0233 |
| 2020/0191477 A1* | 6/2020 | Mak | F25J 3/0242 |
| 2020/0284507 A1 | 9/2020 | McCool et al. | |
| 2021/0088274 A1 | 3/2021 | Liu et al. | |
| 2021/0088275 A1 | 3/2021 | Liu et al. | |

FOREIGN PATENT DOCUMENTS

| | | | |
|---|---|---|---|
| DE | 1960515 | 5/1971 | F25J 1/02 |
| DE | 2354726 | 5/1975 | F17C 9/04 |
| DE | 3149847 | 7/1983 | B01D 5/00 |
| DE | 3622145 | 1/1988 | |
| DE | 19906602 | 8/2000 | F25J 3/08 |
| DE | 102013007208 | 10/2014 | B01D 3/14 |
| EP | 1715267 | 10/2006 | F25J 3/02 |
| EP | 1972875 | 9/2008 | F25J 3/04 |
| EP | 2157013 | 8/2009 | F17C 3/02 |
| EP | 2629035 | 8/2013 | F25J 1/00 |
| FR | 2756368 | 5/1998 | B01D 53/26 |
| GB | 1376678 | 12/1974 | F25J 1/02 |
| GB | 1596330 | 8/1981 | F25J 1/02 |
| GB | 2172388 | 9/1986 | E21B 43/16 |
| GB | 2298034 A * | 8/1996 | F25J 3/0209 |
| GB | 2333148 | 7/1999 | F25J 1/02 |
| GB | 2470062 | 11/2010 | F25J 1/02 |
| GB | 2486036 | 11/2012 | F25J 1/02 |
| JP | 59216785 | 12/1984 | F25J 1/02 |
| JP | 2530859 | 4/1997 | G02F 1/13 |
| JP | 5705271 | 11/2013 | F25J 3/00 |
| JP | 5518531 | 6/2014 | Y02P 20/152 |
| KR | 2010/0112708 | 10/2010 | F17C 5/00 |
| KR | 2011/0079949 | 7/2011 | F25J 3/02 |
| WO | WO2006/120127 | 11/2006 | F25J 3/02 |
| WO | WO2008/133785 | 11/2008 | B63B 25/08 |
| WO | WO2011/101461 | 8/2011 | B63B 25/16 |
| WO | WO2012/031782 | 3/2012 | F25J 1/02 |
| WO | WO2012/162690 | 11/2012 | |
| WO | WO2014/048845 | 4/2014 | F25J 1/00 |
| WO | WO2015/110443 | 7/2015 | F25J 1/00 |
| WO | WO2016/060777 | 4/2016 | |
| WO | WO2017/011123 | 1/2017 | F25J 3/08 |
| WO | WO2017/067871 | 4/2017 | F01D 15/10 |

OTHER PUBLICATIONS

U.S. Appl. No. 62/458,127, filed Feb. 13, 2017, Pierre, Fritz Jr.
U.S. Appl. No. 62/458,131, filed Feb. 13, 2017, Pierre, Fritz Jr.
U.S. Appl. No. 62/463,274, filed Feb. 24, 2017, Kaminsky, Robert D. et al.
U.S. Appl. No. 62/478,961, Balasubramanian, Sathish.
Bach, Wilfried (1990) "Offshore Natural Gas Liquefaction with Nitrogen Cooling—Process Design and Comparison of Coil-Wound and Plate-Fin Heat Exchangers," *Science and Technology Reports*, No. 64, Jan. 1, 1990, pp. 31-37.

Chang, Ho-Myung et al., (2019) "Thermodynamic Design of Methane Liquefaction System Based on Reversed-Brayton Cycle" Cryogenics, pp. 226-234.
ConocoPhillips Liquefied Natural Gas Licensing (2017) "Our Technology and Expertise Are Ready to Work Toward Your LNG Future Today," http://lnglicensing.conocophillips.com/Documents/15-1106% 20LNG%20Brochure_March2016.pdf, Apr. 25, 2017, 5 pgs.
Danish Technologies Institute (2017) "Project—Ice Bank System with Pulsating and Flexible Heat Exchanger (IPFLEX)," https://www.dti.dk/projects/project-ice-bank-system-with-pulsating-andflexible-heat-exchanger-ipflex/37176.
Diocee, T. S. et al. (2004) "Atlantic LNG Train 4—The Worlds Largest LNG Train", *The 14th International Conference and Exhibition on Liquefied Natural Gas (LNG 14)*, Doha, Qatar, Mar. 21-24, 2004, 15 pgs.
Khoo, C. T. et al. (2009) "Execution of LNG Mega Trains—The Qatargas 2 Experience," *WCG*, 2009, 8 pages.
Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.
McLachlan, Greg (2002) "Efficient Operation of LNG From the Oman LNG Project," *Shell Global Solutions International B.V.*, Jan. 1, 2002, pp. 1-8.
Olsen, Lars et al. (2017).
Ott, C. M. et al. (2015) "Large LNG Trains: Technology Advances to Address Market Challenges", *Gastech*, Singapore, Oct. 27-30, 2015, 10 pgs.
Publication No. 43031 (2000) Research Disclosure, Mason Publications, Hampshire, GB, Feb. 1, 2000, p. 239, XP000969014, ISSN: 0374-4353, paragraphs [0004], [0005] & [0006].
Publication No. 37752 (1995) Research Disclosure, Mason Publications, Hampshire, GB, Sep. 1, 1995, p. 632, XP000536225, ISSN: 0374-4353, 1 page.
Ramshaw, Ian et al. (2009) "The Layout Challenges of Large Scale Floating LNG," *ConocoPhillips Global LNG Collaboration*, 2009, 24 pgs, XP009144486.
Riordan, Frank (1986) "A Deformable Heat Exchanger Separated by a Helicoid," *Journal of Physics A: Mathematical and General*, v. 19.9, pp. 1505-1515.
Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.
Shah, Pankaj et al. (2013) "Refrigeration Compressor Driver Selection and Technology Qualification Enhances Value for the Wheatstone Project," *17th Int'l Conf. & Exh. on LNG*, 27 pgs.
Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.
Tianbiao, He et al. (2015), Optimal Synthesis of Expansion Liquefaction Cycle for Distributed-Scale LNG, *Institute of Refrigeration and Cryogenics, Shanghai Jiao Tong University*, pp. 268-280.
Tsang, T. P. et al. (2009) "Application of Novel Compressor/Driver Configuration in the Optimized Cascade Process," *2009 Spring Mtg. and Global Conf. on Process Safety—9th Topical Conf. on Gas Utilization*, 2009, Abstract, 1 pg. https://www.aiche.org/conferences/aiche-spring-meeting-and-globalcongress- on-process-safety/2009/proceeding/paper/7a-application-novel-compressordriver-configurationoptimized-cascader-process.

* cited by examiner

PRETREATMENT AND PRE-COOLING OF NATURAL GAS BY HIGH PRESSURE COMPRESSION AND EXPANSION

CROSS REFERENCE TO RELATED APPLICATIONS

This application claims the priority benefit of United States Provisional Patent Application No. 62/902,459, filed Sep. 19, 2019, entitled PRETREATMENT AND PRE-COOLING OF NATURAL GAS BY HIGH PRESSURE COMPRESSION AND EXPANSION.

This application is related to the following: United States Non-Provisional Patent application Ser. No. 16/410,607, filed May 13, 2019, titled PRETREATMENT AND PRE-COOLING OF NATURAL GAS BY HIGH PRESSURE COMPRESSION AND EXPANSION, which claims the priority benefit of U.S. Provisional Patent Application No. 62/681,938 filed Jun. 7, 2018, titled PRETREATMENT AND PRE-COOLING OF NATURAL GAS BY HIGH PRESSURE COMPRESSION AND EXPANSION; U.S. Non-Provisional patent application Ser. No. 15/348,533, filed Nov. 10, 2016, titled PRE-COOLING OF NATURAL GAS BY HIGH PRESSURE COMPRESSION AND EXPANSION; U.S. Provisional Patent Application No. 62/902,460 (2019EM397), filed on an even date herewith, titled PRETREATEMENT AND PRE-COOLING OF NATURAL GAS BY HIGH PRESSURE COMPRESSION AND EXPANSION; and U.S. Provisional Patent Application No. 62/902,455 (2019EM395), filed on an even date herewith, titled PRETREATEMENT, PRE-COOLING, AND CONDENSATE RECOVERY OF NATURAL GAS BY HIGH PRESSURE COMPRESSION AND EXPANSION, the entirety of all of which are incorporated by reference herein.

FIELD OF THE INVENTION

The invention relates to the liquefaction of natural gas to form liquefied natural gas (LNG), and more specifically, to the production of LNG in remote or sensitive areas where the construction and/or maintenance of capital facilities, and/or the environmental impact of a conventional LNG plant may be detrimental.

BACKGROUND

LNG production is a rapidly growing means to supply natural gas from locations with an abundant supply of natural gas to distant locations with a strong demand for natural gas. The conventional LNG production cycle includes: a) initial treatments of the natural gas resource to remove contaminants such as water, sulfur compounds and carbon dioxide; b) the separation of some heavier hydrocarbon gases, such as propane, butane, pentane, etc. by a variety of possible methods including self-refrigeration, external refrigeration, lean oil, etc.; c) refrigeration of the natural gas substantially by external refrigeration to form liquefied natural gas at near atmospheric pressure and about −160° C.; d) transport of the LNG product in ships or tankers designed for this purpose to a market location; e) re-pressurization and regasification of the LNG at a regasification plant to a pressurized natural gas that may distributed to natural gas consumers. Step (c) of the conventional LNG cycle usually requires the use of large refrigeration compressors often powered by large gas turbine drivers that emit substantial carbon and other emissions. Large capital investment in the billions of US dollars and extensive infrastructure are required as part of the liquefaction plant. Step (e) of the conventional LNG cycle generally includes re-pressurizing the LNG to the required pressure using cryogenic pumps and then re-gasifying the LNG to pressurized natural gas by exchanging heat through an intermediate fluid but ultimately with seawater or by combusting a portion of the natural gas to heat and vaporize the LNG.

Although LNG production in general is well known, technology improvements may still provide an LNG producer with significant opportunities as it seeks to maintain its leading position in the LNG industry. For example, floating LNG (FLNG) is a relatively new technology option for producing LNG. The technology involves the construction of the gas treating and liquefaction facility on a floating structure such as barge or a ship. FLNG is a technology solution for monetizing offshore stranded gas where it is not economically viable to construct a gas pipeline to shore. FLNG is also increasingly being considered for onshore and near-shore gas fields located in remote, environmentally sensitive and/or politically challenging regions. The technology has certain advantages over conventional onshore LNG in that it has a reduced environmental footprint at the production site. The technology may also deliver projects faster and at a lower cost since the bulk of the LNG facility is constructed in shipyards with lower labor rates and reduced execution risk.

Although FLNG has several advantageous over conventional onshore LNG, significant technical challenges remain in the application of the technology. For example, the FLNG structure must provide the same level of gas treating and liquefaction in an area or space that is often less than one quarter of what would be available for an onshore LNG plant. For this reason, there is a need to develop technology that reduces the footprint of the liquefaction facility while maintaining its capacity to thereby reduce overall project cost. Several liquefaction technologies have been proposed for use on an FLNG project. The leading technologies include a single mixed refrigerant (SMR) process, a dual mixed refrigerant (DMR) process, and expander-based (or expansion) process.

In contrast to the DMR process, the SMR process has the advantage of allowing all the equipment and bulks associated with the complete liquefaction process to fit within a single FLNG module. The SMR liquefaction module is placed on the topside of the FLNG structure as a complete SMR train. This "LNG-in-a-Box" concept is favorable for FLNG project execution because it allows for the testing and commissioning of the SMR train at a different location from where the FLNG structure is constructed. It may also allow for the reduction in labor cost since it reduces labor hours at ship yards where labor rates tend to be higher than labor rates at conventional fabrication yards. The SMR process has the added advantage of being a relatively efficient, simple, and compact refrigerant process when compared to other mixed refrigerant processes. Furthermore, the SMR liquefaction process is typically 15% to 20% more efficient than expander-based liquefaction processes.

The choice of the SMR process for LNG liquefaction in an FLNG project has its advantages; however, there are several disadvantages to the SMR process. For example, the required use and storage of combustible refrigerants such as propane significantly increases loss prevention issues on the FLNG. The SMR process is also limited in capacity, which increases the number of trains needed to reach the desired LNG production. Also, to remove heavy hydrocarbons and recover the necessary natural gas liquids for refrigerant makeup, a scrub column is often used. FIG. 1 illustrates a typical LNG liquefaction system 100 integrating a simple SMR process with a scrub column 104. A SMR refrigerant loop 106 cools and liquefies a feed gas stream 102 in one or more heat exchangers 108a, 108b, 108c. Specifically, the SMR refrigerant loop 106 cools the feed gas stream 102 before it is sent to the scrub column 104. Heavy hydrocarbons are removed from a bottom stream 110 of the scrub column 104, and a cooled vapor stream 112 is removed from the top of the scrub column 104. The cooled vapor stream 112 is then cooled and partially condensed in heat exchanger 108b through heat exchange with the SMR refrigerant loop 106. The cooled vapor stream is sent to a separating vessel 114, where the condensed portion of the cooled vapor stream is returned to the scrub column as a liquid reflux stream 116, and the vapor portion 118 of the cooled vapor stream is liquefied through heat exchange with the SMR refrigerant loop 106 in the heat exchanger 108c. An LNG stream 120 exits the LNG liquefaction system 100 for storage and/or transport.

The integrated scrub column design, such as the one depicted in FIG. 1 and described above, is usually the lowest cost option for heavy hydrocarbon removal. However, this design has the disadvantage of reducing train capacity because some of the refrigeration of the SMR train is used in heat exchanger 108b to produce the column reflux. It also has the disadvantage of increasing the equipment count of an SMR train, which may limit the ability to place the SMR train within a single FLNG module. Furthermore, for FLNG applications of greater than 1.5 MTA, multiple SMR trains are required, with each train having its own integrated scrub column. For these reasons and others, a significant amount of topside space and weight is required for the SMR trains. Since topside space and weight are significant drivers for FLNG project cost, there remains a need to improve the SMR liquefaction process to further reduce topside space, weight and complexity to thereby improve project economics. There remains an additional need to develop a heavy hydrocarbon removal process capable of increasing train capacity while also reducing overall equipment count for high production FLNG applications.

The expander-based process has several advantages that make it well suited for FLNG projects. The most significant advantage is that the technology offers liquefaction without the need for external hydrocarbon refrigerants. Removing liquid hydrocarbon refrigerant inventory, such as propane storage, significantly reduces safety concerns on FLNG projects. An additional advantage of the expander-based process compared to a mixed refrigerant process is that the expander-based process is less sensitive to offshore motions since the main refrigerant mostly remains in the gas phase. However, application of the expander-based process to an FLNG project with LNG production of greater than 2 million tons per year (MTA) has proven to be less appealing than the use of the mixed refrigerant process. The capacity of an expander-based process train is typically less than 1.5 MTA. In contrast, a mixed refrigerant process train, such as that of known dual mixed refrigerant processes, can have a train capacity of greater than 5 MTA. The size of the expander-based process train is limited since its refrigerant mostly remains in the vapor state throughout the entire process and the refrigerant absorbs energy through its sensible heat. For these reasons, the refrigerant volumetric flow rate is large throughout the process, and the size of the heat exchangers and piping are proportionately greater than those of a mixed refrigerant process. Furthermore, the limitations in compander horsepower size results in parallel rotating machinery as the capacity of the expander-based process train increases. The production rate of an FLNG project using an expander-based process can be made to be greater than 2 MTA if multiple expander-based trains are allowed. For example, for a 6 MTA FLNG project, six or more parallel expander-based process trains may be sufficient to achieve the required production. However, the equipment count, complexity and cost all increase with multiple expander trains. Additionally, the assumed process simplicity of the expander-based process compared to a mixed refrigerant process begins to be questioned if multiple trains are required for the expander-based process while the mixed refrigerant process can obtain the required production rate with one or two trains. An integrated scrub column design may also be used to remove heavy hydrocarbons for an expander-based liquefaction process. The advantages and disadvantages of its use is similar to that of an SMR process. The use of an integrated scrub column design limits the liquefaction pressure to a value below the cricondenbar of the feed gas. This fact is a particular disadvantage for expander-based processes since its process efficiency is more negatively impacted by lower liquefaction pressures than mixed refrigerant processes. For these reasons, there is a need to develop a high LNG production capacity FLNG liquefaction process with the advantages of an expander-based process. There is a further need to develop an FLNG technology solution that is better able to handle the challenges that vessel motion has on gas processing. There remains a further need to develop a heavy hydrocarbon removal process better suited for expander based process by eliminating the efficiency and production loss associated with conventional technologies.

U.S. Pat. No. 6,412,302 describes a feed gas expander-based process where two independent closed refrigeration loops are used to cool the feed gas to form LNG. In an embodiment, the first closed refrigeration loop uses the feed gas or components of the feed gas as the refrigerant. Nitrogen gas is used as the refrigerant for the second closed refrigeration loop. This technology requires smaller equipment and topside space than a dual loop nitrogen expander-based process. For example, the volumetric flow rate of the refrigerant into the low pressure compressor can be 20 to 50% smaller for this technology compared to a dual loop nitrogen expander-based process. The technology, however, is still limited to a capacity of less than 1.5 MTA.

U.S. Pat. No. 8,616,012 describes a feed gas expander-based process where feed gas is used as the refrigerant in a closed refrigeration loop. Within this closed refrigeration loop, the refrigerant is compressed to a pressure greater than or equal to 1,500 psia (10,340 kPa), or more preferably greater than 2,500 psia (17,240 kPa). The refrigerant is then cooled and expanded to achieve cryogenic temperatures. This cooled refrigerant is used in a heat exchanger to cool the feed gas from warm temperatures to cryogenic temperatures. A subcooling refrigeration loop is then employed to further cool the feed gas to form LNG. In one embodiment, the subcooling refrigeration loop is a closed loop with flash gas used as the refrigerant. This feed gas expander-based process has the advantage of not being limited to a train capacity range of less than 1 MTA. A train size of approximately 6 MTA has been considered. However, the technology has the disadvantage of an increased equipment count and increased complexity due to its requirement for two independent refrigeration loops and the compression of the feed gas.

GB 2,486,036 describes a feed gas expander-based process that is an open loop refrigeration cycle including a pre-cooling expander loop and a liquefying expander loop, where the gas phase after expansion is used to liquefy the natural gas. According to this document, including a liquefying expander in the process significantly reduces the recycle gas rate and the overall required refrigeration power. This technology has the advantage of being simpler than other technologies since only one type of refrigerant is used with a single compression string. However, the technology is still limited to capacity of less than 1.5 MTA and it requires the use of liquefying expander, which is not standard equipment for LNG production. The technology has also been shown to be less efficient than other technologies for the liquefaction of lean natural gas.

U.S. Pat. No. 7,386,996 describes an expander-based process with a pre-cooling refrigeration process preceding the main expander-based cooling circuit. The pre-cooling refrigeration process includes a carbon dioxide refrigeration circuit in a cascade arrangement. The carbon dioxide refrigeration circuit may cool the feed gas and the refrigerant gases of the main expander-based cooling circuit at three pressure levels: a high pressure level to provide the warm-end cooling; a medium pressure level to provide the intermediate temperature cooling; and a low pressure level to provide cold-end cooling for the carbon dioxide refrigeration circuit. This technology is more efficient and has a higher production capacity than expander-based processes lacking a pre-cooling step. The technology has the additional advantage for FLNG applications since the pre-cooling refrigeration cycle uses carbon dioxide as the refrigerant instead of hydrocarbon refrigerants. The carbon dioxide refrigeration circuit, however, comes at the cost of added complexity to the liquefaction process since an additional refrigerant and a substantial amount of extra equipment is introduced. In an FLNG application, the carbon dioxide refrigeration circuit may be in its own module and sized to provide the pre-cooling for multiple expander-based processes. This arrangement has the disadvantage of requiring a significant amount of pipe connections between the pre-cooling module and the main expander-based process modules. The "LNG-in-a-Box" advantages discussed above are no longer realized.

Thus, there remains a need to develop a pre-cooling process that does not require additional refrigerant and does not introduce a significant amount of extra equipment to the LNG liquefaction process. There is an additional need to develop a pre-cooling process that can be placed in the same module as the liquefaction module. Furthermore, there is an additional need to develop a pre-cooling process that can easily integrate with a heavy hydrocarbon removal process and provide auxiliary cooling upstream of liquefaction. Such a pre-cooling process combined with an SMR process or an expander-based process would be particularly suitable for FLNG applications where topside space and weight significantly impacts the project economics. There remains a specific need to develop an LNG production process with the advantages of an expander-based process and which, in addition, has a high LNG production capacity without significantly increasing facility footprint. There is a further need to develop an LNG technology solution that is better able to handle the challenges that vessel motion has on gas processing. Such a high capacity expander-based liquefaction process would be particularly suitable for FLNG applications where the inherent safety and simplicity of expander-based liquefaction process are greatly valued.

SUMMARY OF THE INVENTION

According to disclosed aspects, a method and apparatus for producing liquefied natural gas (LNG) from a natural gas stream is provided. Part or all of the natural gas stream is cooled in a first heat exchanger to generate a cooled natural gas stream. The cooled natural gas stream and the natural gas stream are combined to generate a combined natural gas stream, and heavy hydrocarbons are removed therefrom to thereby generate a separated natural gas stream. The separated natural gas stream is partially condensed in the first heat exchanger to thereby generate a partially condensed natural gas stream, and liquids are separated therefrom to thereby generate a cold pretreated gas stream and a liquid stream. The cold pretreated gas stream is warmed in the first heat exchanger and then compressed in at least one compressor to a pressure of at least 1,500 psia to form a compressed natural gas stream. The compressed natural gas stream is cooled to form a cooled compressed natural gas stream that is expanded, in at least one work producing natural gas expander, to a pressure that is less than 2,000 psia and no greater than the pressure to which the at least one compressor compresses the pretreated natural gas stream, to thereby form a chilled natural gas stream. The chilled natural gas stream is separated into a refrigerant stream and a non-refrigerant stream, and the refrigerant stream is recycled to exchange heat in the first heat exchanger with one or more process streams comprising at least a portion of the natural gas stream, the separated natural gas stream, and the cold pretreated gas stream, thereby generating a warmed refrigerant stream. The warmed refrigerant stream and the non-refrigerant stream are liquefied to form LNG.

The disclosed aspects also provide a method and apparatus for producing liquefied natural gas (LNG) from a natural gas stream. A portion of the natural gas stream is cooled in a first heat exchanger to generate a cooled natural gas stream. The cooled natural gas stream and the natural gas stream are combined to generate a combined natural gas stream, and heavy hydrocarbons are removed therefrom to thereby generate a separated natural gas stream. The separated natural gas stream is partially condensed in the first heat exchanger to thereby generate a partially condensed natural gas stream, and liquids are separated therefrom to thereby generate a cold pretreated gas stream and a liquid stream. The cold pretreated gas stream is warmed in the first heat exchanger and then compressed in at least one compressor to a pressure of at least 1,500 psia to form a compressed natural gas stream. The compressed natural gas stream is cooled to form a cooled compressed natural gas stream that is expanded, in at least one work producing natural gas expander, to a pressure that is less than 2,000 psia and no greater than the pressure to which the at least one compressor compresses the pretreated natural gas stream, to thereby form a chilled natural gas stream. The chilled natural gas stream is recycled through heat exchange with one or more process streams comprising the portion of the natural gas stream, the separated natural gas stream, and the cold pretreated gas stream, thereby generating a warmed refrigerant stream. The warmed refrigerant stream is liquefied to form LNG.

DETAILED DESCRIPTION

Figure 1:
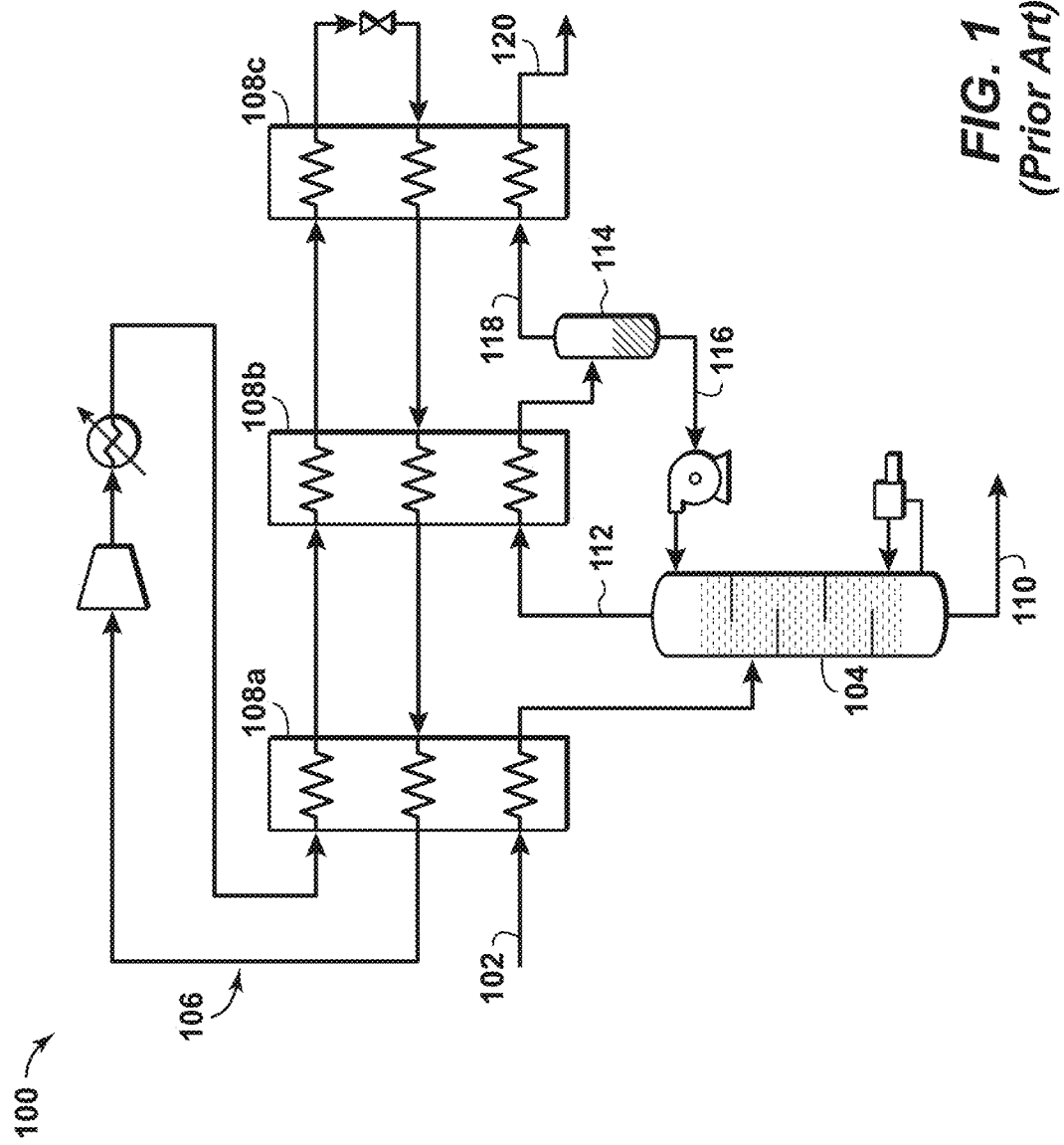
FIG. 1 is a schematic diagram of a SMR process with an integrated scrub column for heavy hydrocarbon removal according to known principles.

Various specific aspects, embodiments, and versions will now be described, including definitions adopted herein. Those skilled in the art will appreciate that such aspects, embodiments, and versions are exemplary only, and that the invention can be practiced in other ways. Any reference to the "invention" may refer to one or more, but not necessarily all, of the embodiments defined by the claims. The use of headings is for purposes of convenience only and does not limit the scope of the present invention. For purposes of clarity and brevity, similar reference numbers in the several Figures represent similar items, steps, or structures and may not be described in detail in every Figure.

All numerical values within the detailed description and the claims herein are modified by "about" or "approximately" the indicated value, and take into account experimental error and variations that would be expected by a person having ordinary skill in the art.

As used herein, the term "compressor" means a machine that increases the pressure of a gas by the application of work. A "compressor" or "refrigerant compressor" includes any unit, device, or apparatus able to increase the pressure of a gas stream. This includes compressors having a single compression process or step, or compressors having multi-stage compressions or steps, or more particularly multi-stage compressors within a single casing or shell. Reference herein to more than one compressor includes more than one single-stage compressor, one or more multi-stage compressors, and any combination thereof. Evaporated streams to be compressed can be provided to a compressor at different pressures. Some stages or steps of a cooling process may involve two or more compressors in parallel, series, or both. The present invention is not limited by the type or arrangement or layout of the compressor or compressors, particularly in any refrigerant circuit.

As used herein, "cooling" broadly refers to lowering and/or dropping a temperature and/or internal energy of a substance by any suitable, desired, or required amount. Cooling may include a temperature drop of at least about 1° C., at least about 5° C., at least about 10° C., at least about 15° C., at least about 25° C., at least about 35° C., or least about 50° C., or at least about 75° C., or at least about 85° C., or at least about 95° C., or at least about 100° C. The cooling may use any suitable heat sink, such as steam generation, hot water heating, cooling water, air, refrigerant, other process streams (integration), and combinations thereof. One or more sources of cooling may be combined and/or cascaded to reach a desired outlet temperature. The cooling step may use a cooling unit with any suitable device and/or equipment. According to some embodiments, cooling may include indirect heat exchange, such as with one or more heat exchangers. In the alternative, the cooling may use evaporative (heat of vaporization) cooling and/or direct heat exchange, such as a liquid sprayed directly into a process stream.

As used herein, the term "environment" refers to ambient local conditions, e.g., temperatures and pressures, in the vicinity of a process.

As used herein, the term "expansion device" refers to one or more devices suitable for reducing the pressure of a fluid in a line (for example, a liquid stream, a vapor stream, or a multiphase stream containing both liquid and vapor). Unless a particular type of expansion device is specifically stated, the expansion device may be (1) at least partially by isenthalpic means, or (2) may be at least partially by isentropic means, or (3) may be a combination of both isentropic means and isenthalpic means. Suitable devices for isenthalpic expansion of natural gas are known in the art and generally include, but are not limited to, manually or automatically, actuated throttling devices such as, for example, valves, control valves, Joule-Thomson (J-T) valves, or venturi devices. Suitable devices for isentropic expansion of natural gas are known in the art and generally include equipment such as expanders or turbo expanders that extract or derive work from such expansion. Suitable devices for isentropic expansion of liquid streams are known in the art and generally include equipment such as expanders, hydraulic expanders, liquid turbines, or turbo expanders that extract or derive work from such expansion. An example of a combination of both isentropic means and isenthalpic means may be a Joule-Thomson valve and a turbo expander in parallel, which provides the capability of using either alone or using both the J-T valve and the turbo expander simultaneously. Isenthalpic or isentropic expansion can be conducted in the all-liquid phase, all-vapor phase, or mixed phases, and can be conducted to facilitate a phase change from a vapor stream or liquid stream to a multiphase stream (a stream having both vapor and liquid phases) or to a single-phase stream different from its initial phase. In the description of the drawings herein, the reference to more than one expansion device in any drawing does not necessarily mean that each expansion device is the same type or size.

The term "gas" is used interchangeably herein with "vapor," and is defined as a substance or mixture of substances in the gaseous state as distinguished from the liquid or solid state. Likewise, the term "liquid" means a substance or mixture of substances in the liquid state as distinguished from the gas or solid state.

A "heat exchanger" broadly means any device capable of transferring heat energy or cold energy from one medium to another medium, such as between at least two distinct fluids. Heat exchangers include "direct heat exchangers" and "indirect heat exchangers." Thus, a heat exchanger may be of any suitable design, such as a co-current or counter-current heat exchanger, an indirect heat exchanger (e.g. a spiral wound heat exchanger or a plate-fin heat exchanger such as a brazed aluminum plate fin type), direct contact heat exchanger, shell-and-tube heat exchanger, spiral, hairpin, core, core-and-kettle, printed-circuit, double-pipe or any other type of known heat exchanger. "Heat exchanger" may also refer to any column, tower, unit or other arrangement adapted to allow the passage of one or more streams therethrough, and to affect direct or indirect heat exchange between one or more lines of refrigerant, and one or more feed streams.

As used herein, the term "heavy hydrocarbons" refers to hydrocarbons having more than four carbon atoms. Principal examples include pentane, hexane and heptane. Other examples include benzene, aromatics, or diamondoids.

As used herein, the term "indirect heat exchange" means the bringing of two fluids into heat exchange relation without any physical contact or intermixing of the fluids with each other. Core-in-kettle heat exchangers and brazed aluminum plate-fin heat exchangers are examples of equipment that facilitate indirect heat exchange.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas stream may also contain ethane ($C_2$), higher molecular weight hydrocarbons, and one or more acid gases. The natural gas may also contain minor amounts of contaminants such as water, nitrogen, iron sulfide, wax, and crude oil.

As used herein, the term "separation device" or "separator" refers to any vessel configured to receive a fluid having at least two constituent elements and configured to produce a gaseous stream out of a top portion and a liquid (or bottoms) stream out of the bottom of the vessel. The separation device/separator may include internal contact-enhancing structures (e.g. packing elements, strippers, weir plates, chimneys, etc.), may include one, two, or more sections (e.g. a stripping section and a reboiler section), and/or may include additional inlets and outlets. Exemplary separation devices/separators include bulk fractionators, stripping columns, phase separators, scrub columns, and others.

As used herein, the term "scrub column" refers to a separation device used for the removal of heavy hydrocarbons from a natural gas stream.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, test procedures, and other documents cited in this application are fully incorporated by reference to the extent such disclosure is not inconsistent with this application and for all jurisdictions in which such incorporation is permitted.

Aspects disclosed herein describe a process for pretreating and pre-cooling natural gas to a liquefaction process for the production of LNG by the addition of a high pressure compression and high pressure expansion process prior to liquefying the natural gas. A portion of the compressed and expanded gas is used to cool one or more process streams associated with pretreating the feed gas. More specifically, the invention describes a process where heavy hydrocarbons are removed from a natural gas stream to form a pretreated natural gas stream. The pretreated natural gas is compressed to pressure greater than 1,500 psia (10,340 kPa), or more preferably greater than 3,000 psia (20,680 kPa). The hot compressed gas is cooled by exchanging heat with the environment to form a compressed pretreated gas. The compressed pretreated gas is near-isentropically expanded to a pressure less than 3,000 psia (20,680 kPa), or more preferably to a pressure less than 2,000 psia (13,790 kPa) to form a first chilled pretreated gas, where the pressure of the first chilled pretreated gas is less than the pressure of the compressed pretreated gas. The first chilled pretreated gas is separated into at least one refrigerant stream and a non-refrigerant stream. The at least one refrigerant stream is directed to at least one heat exchanger where it acts to cool a process stream and form a warmed refrigerant stream. The warmed to refrigerant stream is mixed with the non-refrigerant stream to form a second chilled pretreated gas. The second chilled pretreated gas may be directed to one or more SMR liquefaction trains, or the second chilled pretreated gas may be directed to one or more expander-based liquefaction trains where the gas is further cooled to form LNG.

Figure 2:
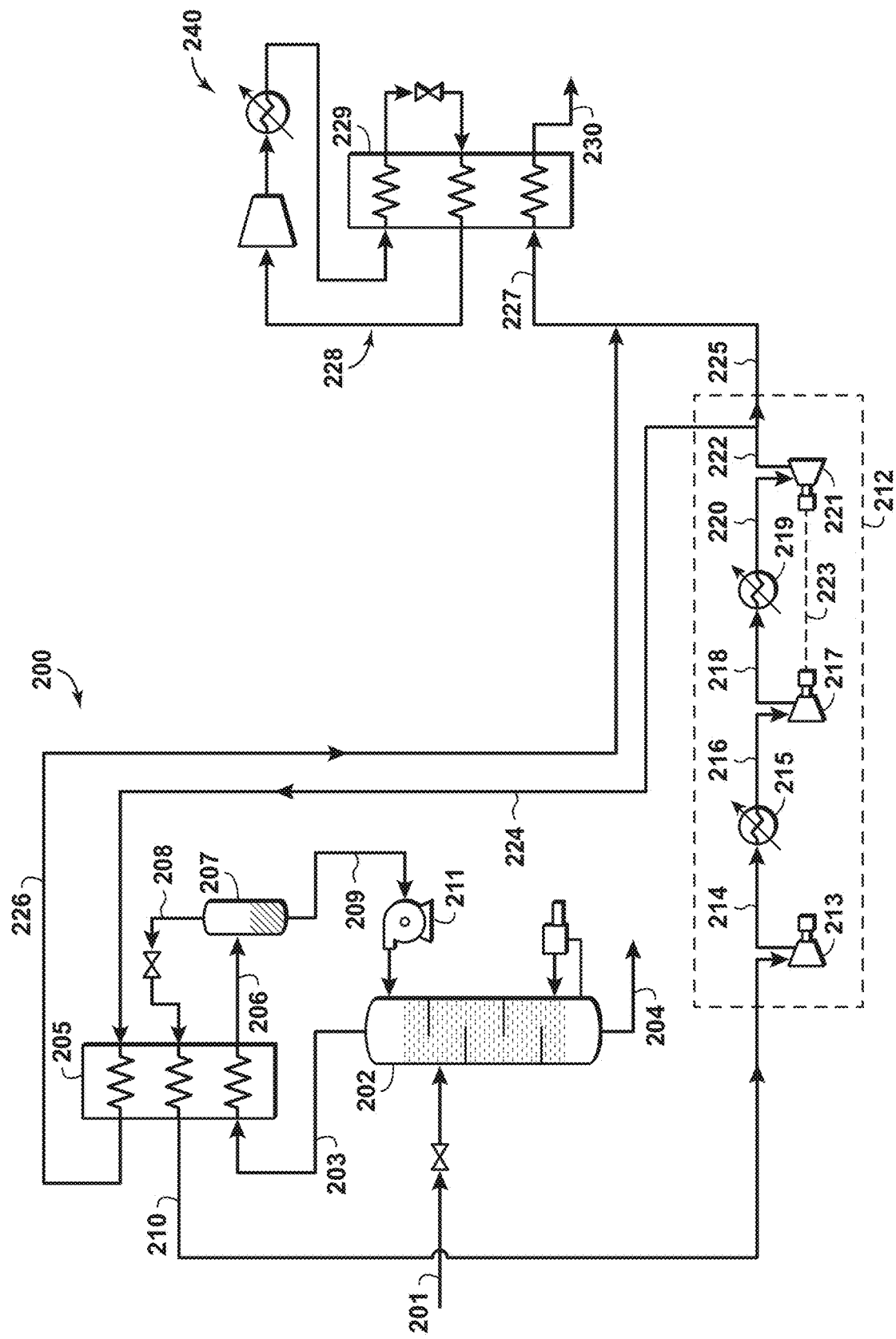
FIG. 2 is a schematic diagram of a high pressure compression and expansion (HPCE) module with heavy hydrocarbon removal according to disclosed aspects.

FIG. 2 is an illustration of a pretreatment apparatus 200 for pretreating and pre-cooling a natural gas stream 201, followed by a high pressure compression and expansion (HPCE) process module 212. A natural gas stream 201 may flow into a separation device, such as a scrub column 202, where the natural gas stream 201 is separated into a column overhead stream 203 and a column bottom stream 204. The column overhead stream 203 may flow through a first heat exchanger 205, known as a 'cold box', where the column overhead stream 203 is partially condensed to form a two-phase stream 206. The two-phase stream 206 may flow into another separation device, such as a separator 207, to form cold pretreated gas stream 208 and a liquid stream 209. The cold pretreated gas stream 208 may flow through the first heat exchanger 205 where the cold pretreated gas stream 208 is warmed by indirectly exchanging heat with the column overhead stream 203, thereby forming a pretreated natural gas stream 210. The liquid stream 209 may be pressurized within a pump 211 and then directed to the scrub column 202 as a column reflux stream.

The HPCE process module 212 may comprise a first compressor 213 which compresses the pretreated natural gas stream 210 to form an intermediate pressure gas stream 214. The intermediate pressure gas stream 214 may flow through a second heat exchanger 215 where the intermediate pressure gas stream 214 is cooled by indirectly exchanging heat with the environment to form a cooled intermediate pressure gas stream 216. The second heat exchanger 215 may be an air cooled heat exchanger or a water cooled heat exchanger. The cooled intermediate pressure gas stream 216 may then be compressed within a second compressor 217 to form a high pressure gas stream 218. The pressure of the high pressure gas stream 218 may be greater than 1,500 psia (10,340 kPa), or more preferably greater than 3,000 psia (20,680 kPa). The high pressure gas stream 218 may flow through a third heat exchanger 219 where the high pressure gas stream 218 is cooled by indirectly exchanging heat with the environment to form a cooled high pressure gas stream 220. The third heat exchanger 219 may be an air cooled heat exchanger or a water cooled heat exchanger. The cooled high pressure gas stream 220 may then be expanded within an expander 221 to form a first chilled pretreated gas stream 222. The pressure of the first chilled pretreated gas stream 222 may be less than 3,000 psia (20,680 kPa), or more preferably less than 2,000 psia (13,790 kPa), and the pressure of the first chilled pretreated gas stream 222 is less than the pressure of the cooled high pressure gas stream 220. In a preferred aspect, the second compressor 217 may be driven solely by the shaft power produced by the expander 221, as indicated by the dashed line 223. The first chilled pretreated gas stream 222 may be separated into a refrigerant stream 224 and a non-refrigerant stream 225. The refrigerant stream 224 may flow through the first heat exchanger 205 where the refrigerant stream 224 is partially warmed by indirectly exchanging heat with the column overhead stream 203, thereby forming a warmed refrigerant stream 226. The warmed refrigerant stream 226 may mix with the non-refrigerant stream 225 to form a second chilled pretreated gas stream 227. The second chilled pretreated gas stream 227 may then be liquefied in, for example, an SMR liquefaction train 240 through indirect heat exchange with an SMR refrigerant loop 228 in a fourth heat exchanger 229. The resultant LNG stream 230 may then be stored and/or transported as needed.

It should be noted that the refrigerant stream 224 may be used to cool or chill any of the process streams associated with the pretreatment apparatus 200. For example, one or more of the column overhead stream 203, the two-phase stream 206, the cold pretreated gas stream 208, the liquid stream 209, and the pretreated natural gas stream 210 may be configured to exchange heat with the refrigerant stream 224. Furthermore, other process streams not associated with the pretreatment apparatus 200 may be cooled through heat exchange with the refrigerant stream 224. The refrigerant stream 224 may be split into two or more sub-streams that are used to cool various process streams.

In an aspect, the SMR liquefaction process may be enhanced by the addition of the HPCE process upstream of the SMR liquefaction process. More specifically, in this aspect, pretreated natural gas may be compressed to a pressure greater than 1,500 psia (10,340 kPa), or more preferably greater than 3,000 psia (20,680 kPa). The hot compressed gas is then cooled by exchanging heat with the environment to form a compressed pretreated gas. The compressed pretreated gas is then near-isentropically expanded to pressure less than 3,000 psia (20,680 kPa), or more preferably to a pressure less than 2,000 psia (13,790 kPa) to form a first chilled pretreated gas, where the pressure of the first chilled pretreated gas is less than the pressure of the compressed pretreated gas. The first chilled pretreated gas stream is separated into a refrigerant stream and a non-refrigerant stream. The refrigerant stream is warmed by exchanging heat with a column overhead stream in order to help partially condense the column overhead stream and produce a warmed refrigerant stream. The warmed refrigerant stream is mixed with the non-refrigerant stream to produce a second chilled pretreated gas. The second chilled pretreated gas may then be directed to multiple SMR liquefaction trains, arranged in parallel, where the chilled pretreated gas is further cooled therein to form LNG.

Figure 3:
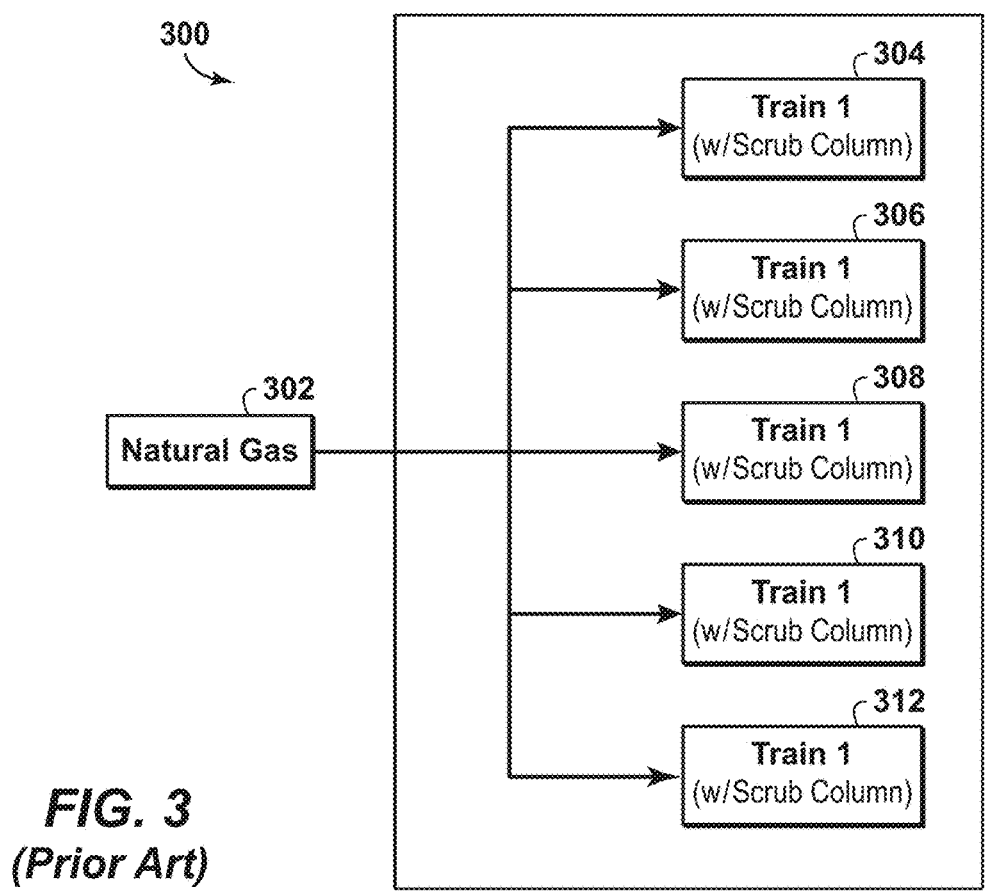
FIG. 3 is a schematic diagram showing an arrangement of single-mixed refrigerant (SMR) liquefaction modules according to known principles.
Figure 4:
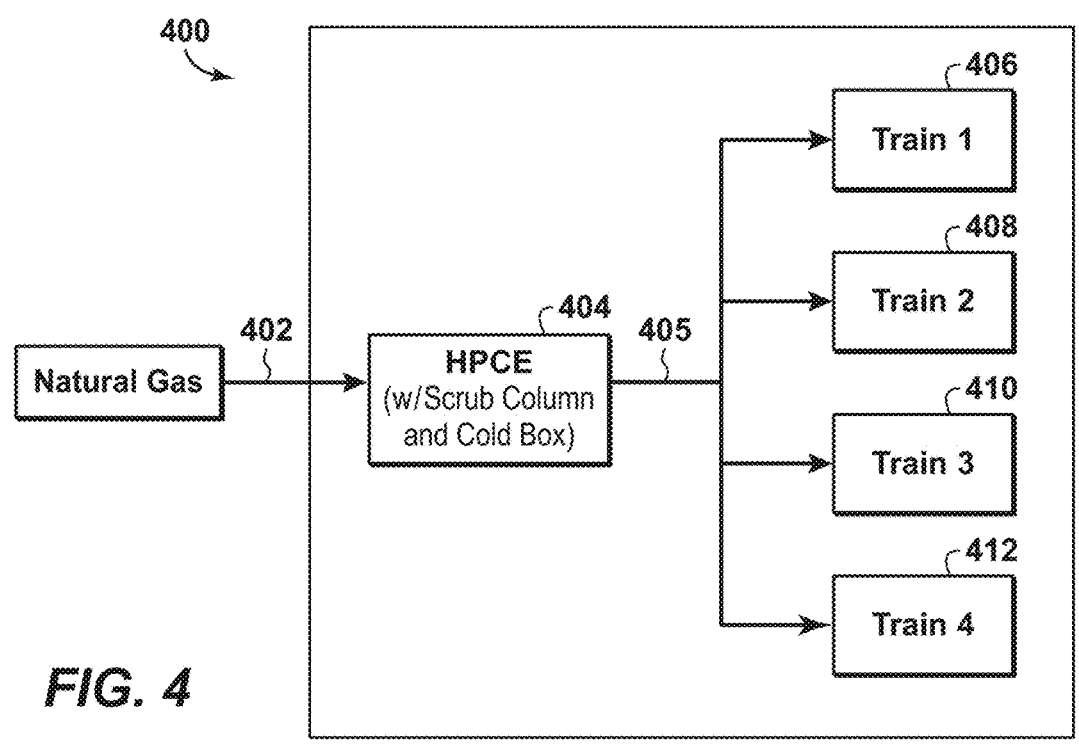
FIG. 4 is a schematic diagram showing an arrangement of SMR liquefaction modules according to disclosed aspects.

The combination of the HPCE process with pretreatment of the natural gas and liquefaction within multiple SMR liquefaction trains has several advantages over the conventional SMR process where natural gas is sent directly to the SMR liquefaction trains for both heavy hydrocarbon removal (final pretreatment step) and liquefaction. For example, the pre-cooling of the natural gas using the HPCE process allows for an increase in LNG production rate within the SMR liquefaction trains for a given horsepower within the SMR liquefaction trains. FIGS. 3 and 4 demonstrate how the disclosed aspects provide such an LNG production increase. FIG. 3 is an illustration of an arrangement of liquefaction modules or trains, such as SMR liquefaction trains, on an LNG production facility such as an FLNG unit 300 according to known principles. A natural gas stream 302 that is pretreated to remove sour gases and water to make the natural gas suitable for cryogenic treatment may be distributed between five identical or nearly identical SMR liquefaction trains 304, 306, 308, 310, 312 arranged in parallel. As an example, each SMR liquefaction train may receive approximately 50 megawatts (MW) of compression power from either a gas turbine or an electric motor (not shown) to drive the compressors of the respective SMR liquefaction train. Each SMR liquefaction module comprises an integrated scrub column to remove heavy hydrocarbons from the natural gas stream and to recover a sufficient amount of natural gas liquids to provide refrigerant make-up. Each SMR liquefaction module may produce approximately 1.5 million tons per year (MTA) of LNG for a total stream production of approximately 7.5 MTA for the entire FLNG unit 300.

In contrast, FIG. 4 schematically depicts an LNG liquefaction facility such as an FLNG unit 400 according to disclosed aspects. FLNG unit 400 includes four SMR liquefaction trains 406, 408, 410, 412 arranged in parallel. Unlike the SMR liquefaction trains shown in FIG. 3, none of the SMR liquefaction trains 406, 408, 410, 412 include a scrub column. Instead, a natural gas stream 402, which is pretreated to remove sour gases and water to make the gas suitable for cryogenic treatment, may be directed to a HPCE module 404 to produce a chilled pretreated gas stream 405. As previously explained, the HPCE module is integrated with a heavy hydrocarbon removal process therein (including a scrub column or similar separator) to remove any hydrocarbons that may form solids during the liquefaction of the natural gas stream 402. The HPCE module 404 may receive approximately 55 MW of compression power, for example, from either a gas turbine or an electric motor (not shown) to drive one or more compressors within the HPCE module 404. The chilled pretreated gas stream 405 may be distributed between the SMR liquefaction modules 406, 408, 410, 412. Each SMR liquefaction module may receive approximately 50 MW of compression power from either a gas turbine or an electric motor (not shown) to drive the compressors of the respective SMR liquefaction modules. Each SMR liquefaction module may produce approximately 1.9 MTA of LNG for a total production of approximately 7.6 MTA of LNG for the FLNG unit 400. If the FLNG unit 400 uses the disclosed HPCE process module integrated with a single scrub column and cold box (referred to collectively as the HPCE process module 404), only a single scrub column is required to remove heavy hydrocarbons from the natural gas stream 402. The replacement of one SMR liquefaction train with the disclosed HPCE module 404 is advantageous since the HPCE module is expected to be smaller, of less weight, and having significantly lower cost than the replaced SMR liquefaction train. Like the replaced SMR liquefaction train, the HPCE module 404 may have an equivalent size gas turbine to provide compression power, and it will also have an equivalent amount of air or water coolers. Unlike the replaced SMR liquefaction train, however, the HPCE module 404 does not have an expensive main cryogenic heat exchanger. The vessels and pipes associated with the refrigerant flow within an SMR module are eliminated in the replaced HPCE liquefaction train. Furthermore, the amount of expensive cryogenic pipes in the HPCE module 404 is significantly reduced.

The disclosed HPCE module comprises a single scrub column used to remove the heavy hydrocarbons from the natural gas that is then fed to all the liquefaction trains. This design increases the required power of the HPCE module by 10 to 15% compared to a design where heavy hydrocarbon removal is not included. However, integrating the heavy hydrocarbon removal within the HPCE module instead of within each SMR liquefaction train reduces the weight of each SMR liquefaction train and may result in a total reduction in equipment count and overall topside weight of an FLNG system. Another advantage is that the liquefaction pressure can be greater than the cricondenbar of the feed gas, which results in increased liquefaction efficiency. Furthermore, the proposed design is more flexible to feed gas changes than the integrated scrub column design.

Another advantage of the disclosed HPCE module is that the required storage of refrigerant is reduced since the number of SMR liquefaction trains has been reduced by one. Also, since a large fraction of the warm temperature cooling of the gas occurs in the HPCE module, the heavier hydrocarbon components of the mixed refrigerant can be reduced. For example, the propane component of the mixed refrigerant may be eliminated without any significant reduction in efficiency of the SMR liquefaction process.

Another advantage is that for a SMR liquefaction process which receives chilled pretreated gas from the disclosed HPCE module, the volumetric flow rate of the vaporized refrigerant of the SMR liquefaction process can be more than 25% less than that of a conventional SMR liquefaction process receiving warm pretreated gas. The lower volumetric flow of refrigerant may reduce the size of the main cryogenic heat exchanger and the size of the low pressure mixed refrigerant compressor. The lower volumetric flow rate of the refrigerant is due to its higher vaporizing pressure compared to that of a conventional SMR liquefaction process.

Known propane-precooled mixed refrigeration processes and dual mixed refrigeration (DMR) processes may be viewed as versions of an SMR liquefaction process combined with a pre-cooling refrigeration circuit, but there are significant differences between such processes and aspects of the present disclosure. For example, the known processes use a cascading propane refrigeration circuit or a warm-end mixed refrigerant to pre-cool the gas. Both these known processes have the advantage of providing 5% to 15% higher efficiency than the SMR liquefaction process. Furthermore, the capacity of a single liquefaction train using these known processes can be significantly greater than that of a single SMR liquefaction train. The pre-cooling refrigeration circuit of these technologies, however, comes at the cost of added complexity to the liquefaction process since additional refrigerants and a substantial amount of extra equipment is introduced. For example, the DMR liquefaction process's disadvantage of higher complexity and weight may outweigh its advantages of higher efficiency and capacity when deciding between a DMR liquefaction process and an SMR liquefaction process for an FLNG application. The known processes have considered the addition of a pre-cooling process upstream of the SMR liquefaction process as being driven principally by the need for higher thermal efficiencies and higher LNG production capacity for a single liquefaction train. The disclosed HPCE process combined with the SMR liquefaction process has not been realized previously because it does not provide the higher thermal efficiencies that the refrigerant-based pre-cooling process provides. As described herein, the thermal efficiency of the HPCE process with the SMR liquefaction is about the same as a standalone SMR liquefaction process. The disclosed aspects are believed to be novel based at least in part on its description of a pre-cooling process that aims to reduce the weight and complexity of the liquefaction process rather than increase thermal efficiency, which in the past has been the biggest driver for the addition of a pre-cooling process for onshore LNG applications. As an additional point, the integrated scrub column design is traditionally seen as the lowest cost option for heavy hydrocarbon removal of natural gas to liquefaction. However, the integration of heavy hydrocarbon removal with a HPCE process, as disclosed herein, provides a previously unrealized advantage of potentially reducing total equipment count and weight when multiple liquefaction trains is the preferred design methodology. For the newer applications of FLNG and remote onshore application, footprint, weight, and complexity of the liquefaction process may be a bigger driver of project cost. Therefore the disclosed aspects are of particular value.

In an aspect, an expander-based liquefaction process may be enhanced by the addition of an HPCE process upstream of the expander-based process. More specifically, in this aspect, a pretreated natural gas stream may be compressed to pressure greater than 1,500 psia (10,340 kPa), or more preferably greater than 3,000 psia (20,680 kPa). The hot compressed gas may then be cooled by exchanging heat with the environment to form a compressed pretreated gas. The compressed pretreated gas may be near-isentropically expanded to a pressure less than 3,000 psia (20,680 kPa), or more preferably to a pressure less than 2,000 psia (13,790 kPa) to form a first chilled pretreated gas, where the pressure of the first chilled pretreated gas is less than the pressure of the compressed pretreated gas. The first chilled pretreated gas stream is separated into refrigerant stream and a non-refrigerant stream. The refrigerant stream is warmed by exchanging heat with a column overhead stream in order to help partially condense the column overhead stream and produce a warmed refrigerant stream. The warmed refrigerant stream is mixed with the non-refrigerant stream to produce a second chilled pretreated gas. The second chilled pretreated gas is directed to an expander-based process where the gas is further cooled to form LNG. In a preferred aspect, the second chilled pretreated gas may be directed to a feed gas expander-based process.

Figure 5:
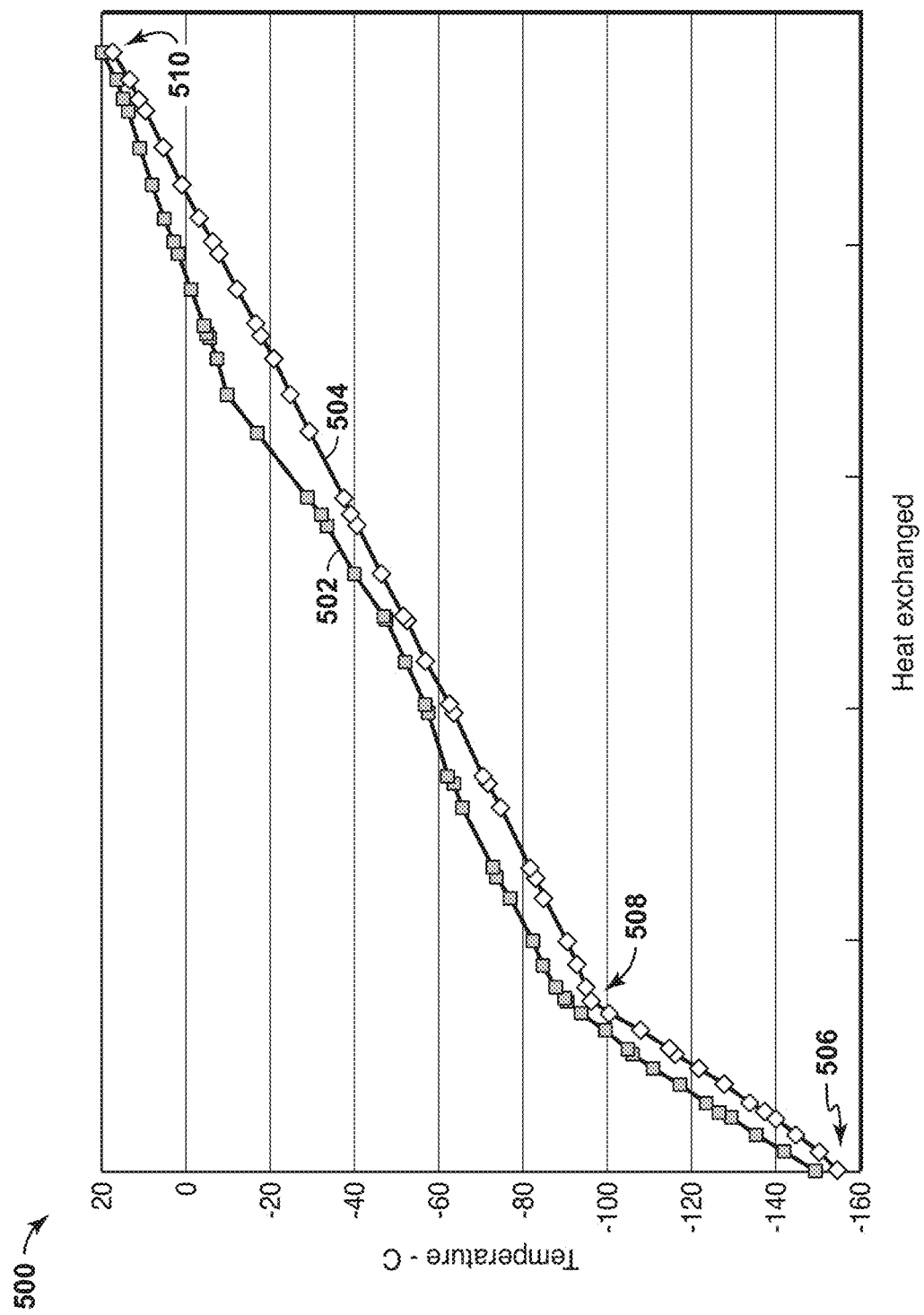
FIG. 5 is a graph showing a heating and cooling curve for an expander-based refrigeration process.

FIG. 5 shows a typical temperature cooling curve 500 for an expander-based liquefaction process. The higher temperature curve 502 is the temperature curve for the natural gas stream. The lower temperature curve 504 is the composite temperature curve of a cold cooling stream and a warm cooling stream. The natural gas is liquefied at pressure above its cricondenbar which allows for the close matching of the natural gas cooling curve (shown at 502) with the composite temperature curve of the cold and warm cooling streams (shown at 504) to maximize thermal efficiency. As illustrated, the cooling curve is marked by three temperature pinch-points 506, 508, and 510. Each pinch point is a location within the heat exchanger where the combined heat capacity of the cooling streams is less than that of the natural gas stream. This imbalance in heat capacity between the streams results in a reduction of the temperature difference between the cooling stream to the minimally acceptable temperature difference which provides effective heat transfer rate. The lowest temperature pinch-point 506 occurs where the colder of the two cooling streams, typically the cold cooling stream, enters the heat exchanger. The intermediate temperature pinch-point 508 occurs where the second cooling stream, typically the warm cooling stream, enters the heat exchanger. The warm temperature pinch-point 510 occurs where the cold and warm cooling streams exit the heat exchanger. The warm temperature pinch-point 510 causes a need for a high mass flow rate for the warmer cooling stream, which subsequently increases the power demand of the expander-based process.

One proposed method to eliminate the warm temperature pinch-point 510 is to pre-cool the feed gas with an external refrigeration system such as a propane cooling system or a carbon dioxide cooling system. For example, U.S. Pat. No. 7,386,996 eliminates the warm temperature pinch-point by using a pre-cooling refrigeration process comprising a carbon dioxide refrigeration circuit in a cascade arrangement. This external pre-cooling refrigeration system has the disadvantage of significantly increasing the complexity of the liquefaction process since an additional refrigerant system with all its associated equipment is introduced. Aspects disclosed herein reduce the impact of the warm temperature pinch-point 510 by pre-cooling the feed gas stream by compressing the feed gas to a pressure greater than 1,500 psia (10,340 kPa), cooling the compressed feed gas stream, and expanding the compressed gas stream to a pressure less than 2,000 psia (20,690 kPa), where the expanded pressure of the feed gas stream is less than the compressed pressure of the feed gas stream. This process of cooling the feed gas stream results in a significant reduction in the in the required mass flow rate of the expander-based process cooling streams. It also improves the thermodynamic efficiency of the expander-based process without significantly increasing the equipment count and without the addition of an external refrigerant. This process may also be integrated with heavy hydrocarbon removal in order to remove the heavy hydrocarbon upstream of the liquefaction process. Since the gas is now free of heavy hydrocarbons that would form solids, the pretreated gas can be liquefied at a pressure above its cricondenbar in order to improve liquefaction efficiency.

In a preferred aspect, the expander-based process may be a feed gas expander-based process. This feed gas expander process comprises a first closed expander-based refrigeration loop and a second closed expander-based refrigeration loop. The first expander-based refrigeration loop may be principally charged with methane from a feed gas stream. The first expander-based refrigeration loop liquefies the feed gas stream. The second expander-based refrigeration loop may be charged with nitrogen as the refrigerant. The second expander-based refrigeration loop sub-cools the LNG streams. Specifically, a produced natural gas stream may be treated to remove impurities, if present, such as water, and sour gases, to make the natural gas suitable for cryogenic treatment. The treated natural gas stream may be directed to a scrub column where the treated natural gas stream is separated into a column overhead stream and a column bottom stream. The column overhead stream may be partially condensed within a first heat exchanger by indirectly exchanging heat with a cold pretreated gas stream and a refrigerant stream to thereby form a two phase stream. The two phase stream may be directed to a separator where the two phase stream is separated into the cold pretreated gas stream and a liquid stream. The cold pretreated gas stream may be warmed within the first heat exchanger by exchanging heat with the column overhead stream to form a pretreated natural gas stream. The liquid stream may be pressurized within a pump and then directed to the scrub column to provide reflux to the scrub column. The pretreated natural gas stream may be directed to an HPCE process as disclosed herein, where it is compressed to a pressure greater than 1,500 psia (10,340 kPa), or more preferably greater than 3,000 psia (20,680 kPa). The hot compressed gas stream may then be cooled by exchanging heat with the environment to form a compressed treated natural gas stream. The compressed treated natural gas stream may be near-isentropically expanded to a pressure less than 3,000 psia (20,680 kPa), or more preferably to a pressure less than 2,000 psia (12,790 kPa) to form a first chilled treated natural gas stream, where the pressure of the first chilled treated natural gas stream is less than the pressure of the compressed treated natural gas stream. The first chilled natural gas stream may be separated into the refrigerant stream and a non-refrigerant stream. The refrigerant stream may be partially warmed within the first heat exchanger by exchanging heat with the column overhead stream to form a warmed refrigerant stream. The warmed refrigerant stream may mix with the non-refrigerant stream to form a second chilled natural gas stream. The second chilled treated natural gas may be directed to the feed gas expander process where the first expander-based refrigeration loop acts to liquefy the second chilled treated natural gas to form a pressurized LNG stream. The second expander refrigeration loop then acts to subcool the pressurized LNG stream. The subcooled pressurized LNG stream may then be expanded to a lower pressure in order to form an LNG stream.

The combination of the HPCE process with pretreatment of the natural gas and liquefaction of the pretreated gas within an expander-based process has several advantages over a conventional expander-based process. Including the HPCE process therewith may increase the efficiency of the expander-based process by 5 to 25% depending of the type of expander-based process employed. The feed gas expander process described herein may have a liquefaction efficiency similar to that of an SMR process while still providing the advantages of no external refrigerant use, ease of operation, and reduced equipment count. Furthermore, the refrigerant flow rates and the size of the recycle compressors are expected to be significantly lower for the expander-base process combined with the HPCE process. For these reasons, the production capacity of a single liquefaction train according to disclosed aspects may be greater than 30 to 50% above the production capacity of a similarly sized conventional expander-based liquefaction process. The combination of HPCE process with heavy hydrocarbon removal upstream of an expander-based liquefaction process has the additional benefit of providing the option to liquefy the gas at pressures above its cricondenbar to improve liquefaction efficiency. Expander-based liquefaction processes are particularly sensitive to liquefaction pressures. Therefore, the HPCE process described herein is well suited for removing heavy hydrocarbons while also increasing the liquefaction efficiency and production capacity of expander-based liquefaction processes.

Figure 6:
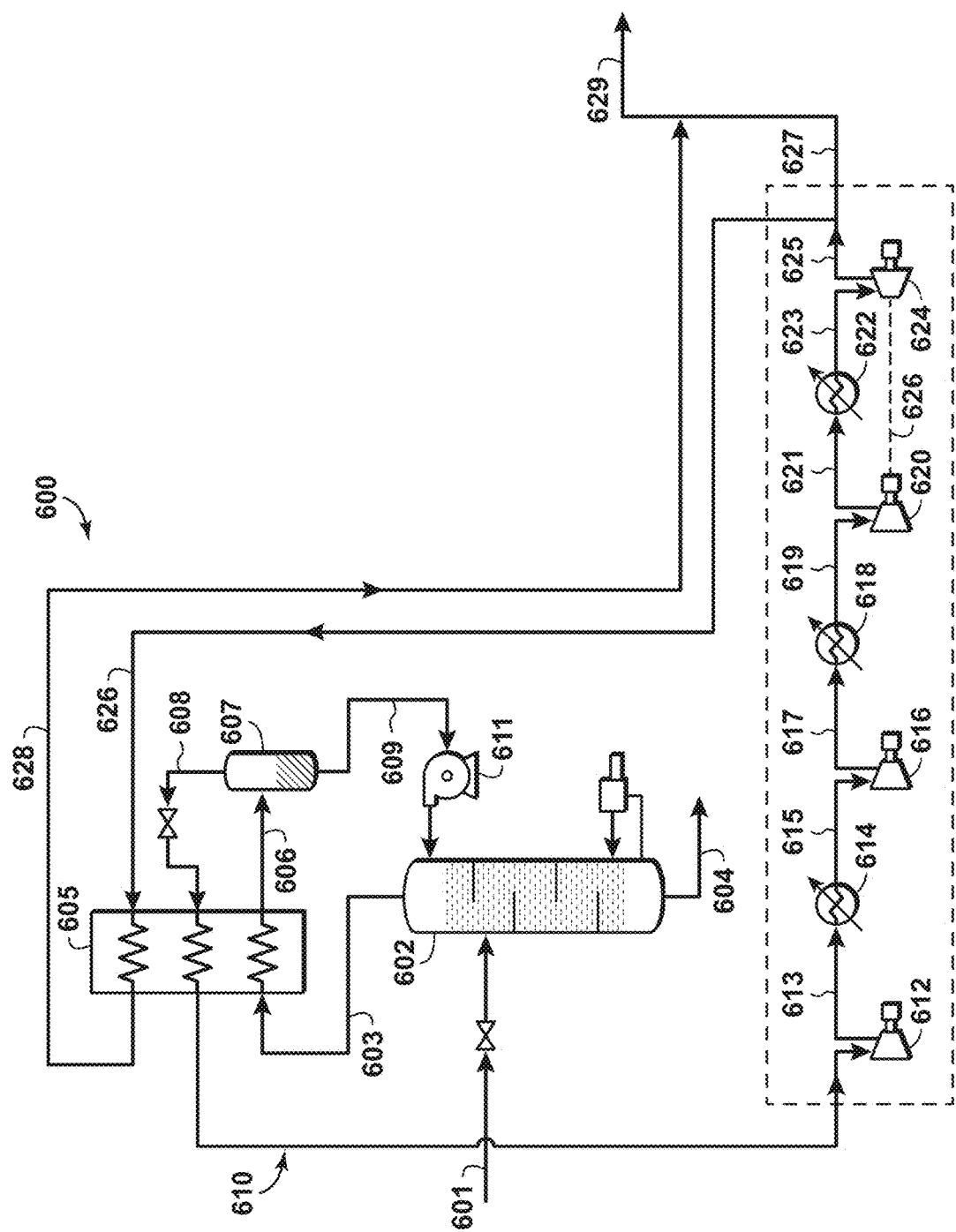
FIG. 6 is a schematic diagram of an HPCE module with heavy hydrocarbon removal according to disclosed aspects.

FIG. 6 is an illustration of an aspect of an HPCE module 600 with an integrated scrub column according to another aspect of the disclosure. A natural gas stream 601, which has been pretreated to remove sour gases and water to make the gas suitable for cryogenic treatment, is fed into a separation device, such as a scrub column 602, where the natural gas stream 601 is separated into a column overhead stream 603 and a column bottom stream 604. The column overhead stream 603 may flow through a first heat exchanger 605 where the column overhead stream 603 is partially condensed to form a two-phase stream 606. The two-phase stream 606 may be directed to another separation device, such as a separator 607, to form a cold pretreated gas stream 608 and a liquid stream 609. The cold pretreated gas stream 608 may flow through the first heat exchanger 605 where the cold pretreated gas stream 608 is warmed by indirect heat exchange with the column overhead stream 603 to form a pretreated natural gas stream 610 therefrom. The liquid stream may be pressurized within a pump 611 and then directed to the scrub column 602 as a column reflux stream. The pretreated natural gas stream 610 is directed to a first compressor 612 and compressed therein to form a first intermediate pressure gas stream 613. The first intermediate pressure gas stream 613 may flow through a second heat exchanger 614 where the first intermediate pressure gas stream 613 is cooled by indirect heat exchange with the environment to form a cooled first intermediate pressure gas stream 615. The second heat exchanger 614 may be an air cooled heat exchanger or a water cooled heat exchanger. The cooled first intermediate pressure gas stream 615 may then be compressed within a second compressor 616 to form a second intermediate pressure gas stream 617. The second intermediate pressure gas stream 617 may flow through a third heat exchanger 618 where the second intermediate pressure gas stream 617 is cooled by indirect heat exchange with the environment to form a cooled second intermediate pressure gas stream 619. The third heat exchanger 618 may be an air cooled heat exchanger or a water cooled heat exchanger. The cooled second intermediate pressure gas stream 619 may then be compressed within a third compressor 620 to form a high pressure gas stream 621. The pressure of the high pressure gas stream 621 may be greater than 1,500 psia (10,340 kPa), or more preferably greater than 3,000 psia (20,680 kPa). The high pressure gas stream 621 may flow through a fourth heat exchanger 622 where the high pressure gas stream 621 is cooled by indirectly exchanging heat with the environment to form a cooled high pressure gas stream 623. The fourth heat exchanger 622 may be an air cooled heat exchanger or a water cooled heat exchanger. The cooled high pressure gas stream 623 may then be expanded within an expander 624 to form a first chilled pretreated gas stream 625. The pressure of the first chilled pretreated gas stream 625 may be less than 3,000 psia (20,680 kPa), or more preferably less than 2,000 psia (13,790 kPa), and the pressure of the first chilled pretreated gas stream 625 may be less than the pressure of the cooled high pressure gas stream 623. In an aspect, the third compressor 620 may be driven solely by the shaft power produced by the expander 624, as illustrated by line 624a.

The first chilled pretreated gas stream 625 may be separated into a refrigerant stream 626 and a non-refrigerant stream 627. The refrigerant stream 626 may flow through the first heat exchanger 605 where the refrigerant stream 626 is partially warmed by indirectly exchanging heat with the column overhead stream 603 to form a warmed refrigerant stream 628 therefrom. The warmed refrigerant stream 628 may mix with the non-refrigerant stream 627 to form a second chilled pretreated gas stream 629, which may then be liquefied by an SMR liquefaction process as previously explained. As with pretreatment apparatus 200, the refrigerant stream 626 may be used to cool any process stream associated or not associated with the HPCE module 600.

Figure 7:
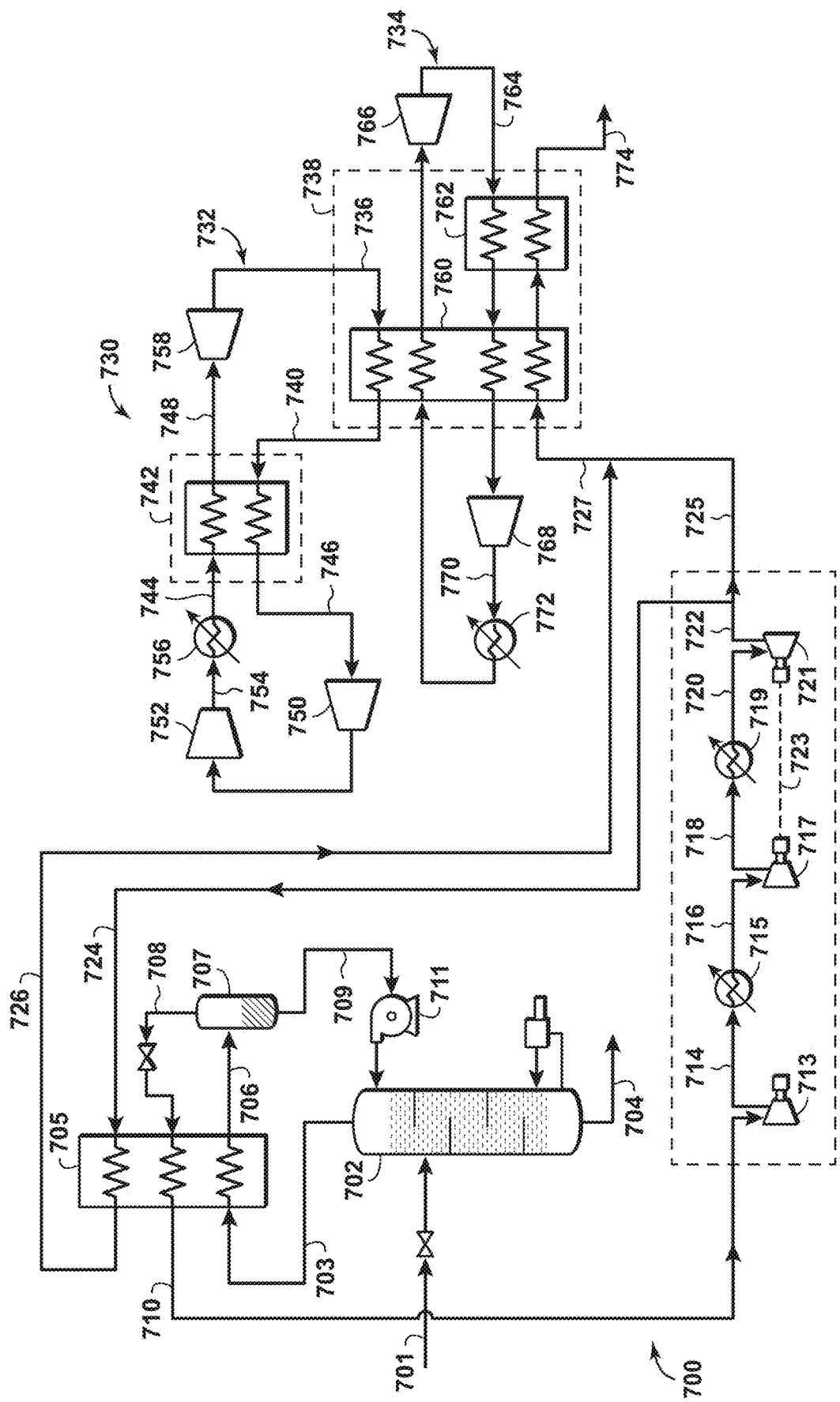
FIG. 7 is a schematic diagram of an HPCE module with heavy hydrocarbon removal and a feed gas expander-based liquefaction module according to disclosed aspects.

FIG. 7 is an illustration of an HPCE module 700 with an integrated scrub column and combined with a feed gas expander-based LNG liquefaction process according to disclosed aspects. A natural gas stream 701, which has been pretreated to remove sour gases and water to make the gas suitable for cryogenic treatment, is fed into a separation device, such as a scrub column 702, where the treated natural gas stream 701 is separated into a column overhead stream 703 and a column bottom stream 704. The column overhead stream 703 may flow through a first heat exchanger 705 where the column overhead stream 703 is partially condensed to form a two-phase stream 706. The two-phase stream 706 may be directed to another separation device, such as a separator 707, to form a cold pretreated gas stream 708 and a liquid stream 709. The cold pretreated gas stream 708 may flow through the first heat exchanger 705 where the cold pretreated gas stream 708 is warmed by indirect heat exchange with the column overhead stream 703 to form a pretreated natural gas stream 710 therefrom. The liquid stream 709 may be pressurized within a pump 711 and then directed to the scrub column 702 as a column reflux. The pretreated natural gas stream 710 is directed to a first compressor 713 and compressed therein to form an intermediate pressure gas stream 714. The intermediate pressure gas stream 714 may flow through a second heat exchanger 715 where the intermediate pressure gas stream 714 is cooled by indirect heat exchange with the environment to form a cooled intermediate pressure gas stream 716. The second heat exchanger 715 may be an air cooled heat exchanger or a water cooled heat exchanger. The cooled intermediate pressure gas stream 716 may then be compressed within a second compressor 717 to form a high pressure gas stream 718. The pressure of the high pressure gas stream 718 may be greater than 1,500 psia (10,340 kPa), or more preferably greater than 3,000 psia (20,680 kPa). The high pressure gas stream 718 may flow through a third heat exchanger 719 where the high pressure gas stream 718 is cooled by indirect heat exchange with the environment to form a cooled high pressure gas stream 720. The third heat exchanger 719 may be an air cooled heat exchanger or a water cooled heat exchanger. The cooled high pressure gas stream 720 may then be expanded within an expander 721 to form a first chilled pretreated gas stream 722. The pressure of the first chilled pretreated gas stream 722 is less than 3,000 psia (20,680 kPa), or more preferably less than 2,000 psia (13,790 kPa), and where the pressure of the first chilled to pretreated gas stream 722 is less than the pressure of the cooled high pressure gas stream 720. In an aspect, the second compressor 717 may be driven solely by the shaft power produced by the expander 721, as represented by the dashed line 723. The first chilled pretreated gas stream 722 may be separated into a refrigerant stream 724 and a non-refrigerant stream 725. The refrigerant stream 724 may flow through the first heat exchanger 705 where the refrigerant stream 724 is partially warmed by indirect heat exchange with the column overhead stream 703 to form a warmed refrigerant stream 726 therefrom. The warmed refrigerant stream 726 may mix with the non-refrigerant stream 725 to form a second chilled pretreated gas stream 727. As with pretreatment apparatus 200 and HPCE module 600, the refrigerant stream 724 may be used to cool any process stream associated or not associated with the HPCE module 700.

As illustrated in FIG. 7, the second chilled pretreated gas stream 727 is directed to a feed gas expander-based LNG liquefaction process 730. The feed gas expander-based process 730 includes a primary cooling loop 732, which is a closed expander-based refrigeration loop that may be charged with components from the feed gas stream. The liquefaction system also includes a subcooling loop 734, which is also a closed expander-based refrigeration loop preferably charged with nitrogen as the sub-cooling refrigerant. Within the primary cooling loop 732, an expanded, cooled refrigerant stream 736 is directed to a first heat exchanger zone 738 where it exchanges heat with the second chilled pretreated gas stream 727 to form a first warm refrigerant stream 740. The first warm refrigerant stream 740 is directed to a second heat exchanger zone 742 where it exchanges heat with a compressed, cooled refrigerant stream 744 to additionally cool the compressed, cooled refrigerant stream 744 and form a second warm refrigerant stream 746 and a compressed, additionally cooled refrigerant stream 748. The second heat exchanger zone 742 may comprise one or more heat exchangers where the one or more heat exchangers may be of a printed circuit heat exchanger type, a shell and tube heat exchanger type, or a combination thereof. The heat exchanger types within the second heat exchanger zone 742 may have a design pressure of greater than 1,500 psia, or more preferably, a design pressure of greater than 2,000 psia, or more preferably, a design pressure of greater than 3,000 psia.

The second warm refrigerant stream 746 is compressed in one or more compression units 750, 752 to a pressure greater than 1,500 psia, or more preferably, to a pressure of approximately 3,000 psia, to thereby form a compressed refrigerant stream 754. The compressed refrigerant stream 754 is then cooled against an ambient cooling medium (air or water) in a cooler 756 to produce the compressed, cooled refrigerant stream 744. The compressed, additionally cooled refrigerant stream 748 is near isentropically expanded in an expander 758 to produce the expanded, cooled refrigerant stream 736. The expander 758 may be a work expansion device, such as a gas expander, which produces work that may be extracted and used for compression.

The first heat exchanger zone 738 may include a plurality of heat exchanger devices, and in the aspects shown in FIG. 7, the first heat exchanger zone includes a main heat exchanger 760 and a sub-cooling heat exchanger 762. These heat exchangers may be of a brazed aluminum heat exchanger type, a plate fin heat exchanger type, a spiral wound heat exchanger type, or a combination thereof.

Within the sub-cooling loop 734, an expanded sub-cooling refrigerant stream 764 (preferably comprising nitrogen) is discharged from an expander 766 and drawn through the sub-cooling heat exchanger 762 and the main heat exchanger 760. The expanded sub-cooling refrigerant stream 764 is then sent to a compression unit 768 where it is re-compressed to a higher pressure and warmed. After exiting compression unit 768, the resulting recompressed sub-cooling refrigerant stream 770 is cooled in a cooler 772. After cooling, the recompressed sub-cooling refrigerant stream 770 is passed through the main heat exchanger 760 where it is further cooled by indirect heat exchange with the expanded, cooled refrigerant stream 736 and the expanded sub-cooling refrigerant stream 764. After exiting the first heat exchanger area 738, the re-compressed and cooled sub-cooling refrigerant stream is expanded through the expander 766 to provide the expanded sub-cooling refrigerant stream 764 that is re-cycled through the first heat exchanger zone as described herein. In this manner, the second chilled pretreated gas stream 727 is further cooled, liquefied and sub-cooled in the first heat exchanger zone 738 to produce a sub-cooled gas stream 774. The sub-cooled gas stream 774 may be expanded to a lower pressure to produce the LNG stream (not shown).

Figure 8:
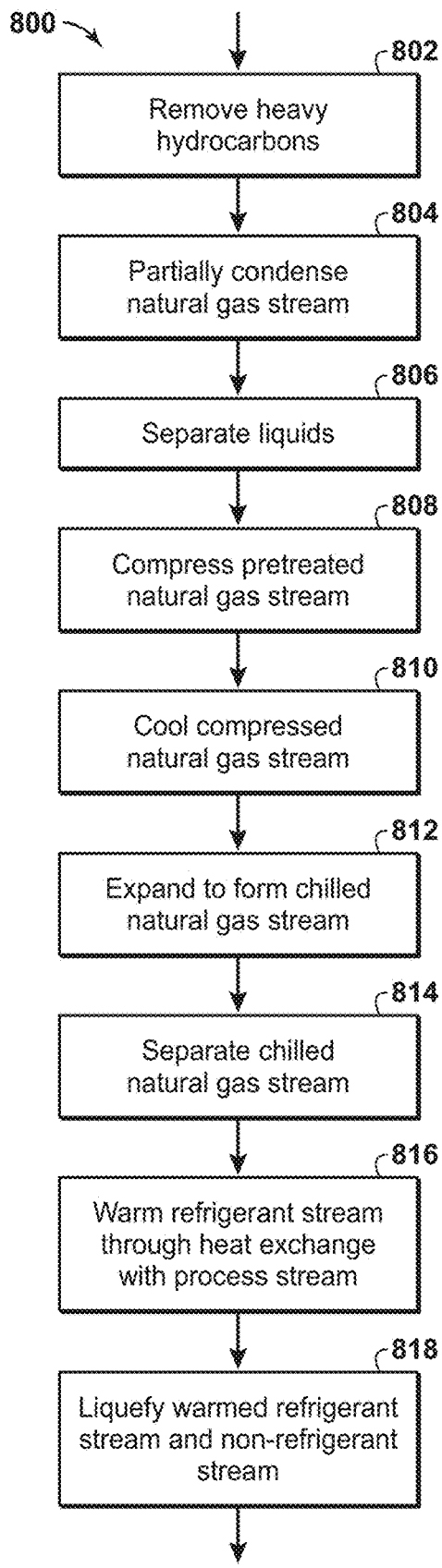
FIG. 8 is a flowchart of a method of liquefying natural gas to form LNG according to disclosed aspects.

FIG. 8 illustrates a method 800 of producing LNG according to disclosed aspects. At block 802 heavy hydrocarbons are removed from the natural gas stream to thereby generate a separated natural gas stream. At block 804 the separated natural gas stream is partially condensed in a first heat exchanger to thereby generate a partially condensed natural gas stream. At block 806 liquids are separated from the partially condensed natural gas stream to thereby generate a pretreated natural gas stream. At block 808 the pretreated natural gas stream is compressed in at least two serially arranged to compressors to a pressure of at least 1,500 psia to form a compressed natural gas stream. At block 810 the compressed natural gas stream is cooled to form a cooled compressed natural gas stream. At block 812 the cooled natural gas stream is expanded to a pressure that is less than 2,000 psia and no greater than the pressure to which the at least two serially arranged compressors compress the pretreated natural gas stream, to thereby form a chilled natural gas stream. At block 814 the chilled natural gas stream is separated into a refrigerant stream and a non-refrigerant stream. At block 816 the refrigerant stream is warmed through heat exchange with one or more process streams comprising the natural gas stream, the separated natural gas stream, the partially condensed natural gas stream, and the pretreated natural gas stream, thereby generating a warmed refrigerant stream. At block 818 the warmed refrigerant stream and the non-refrigerant stream are liquefied.

Figure 9:
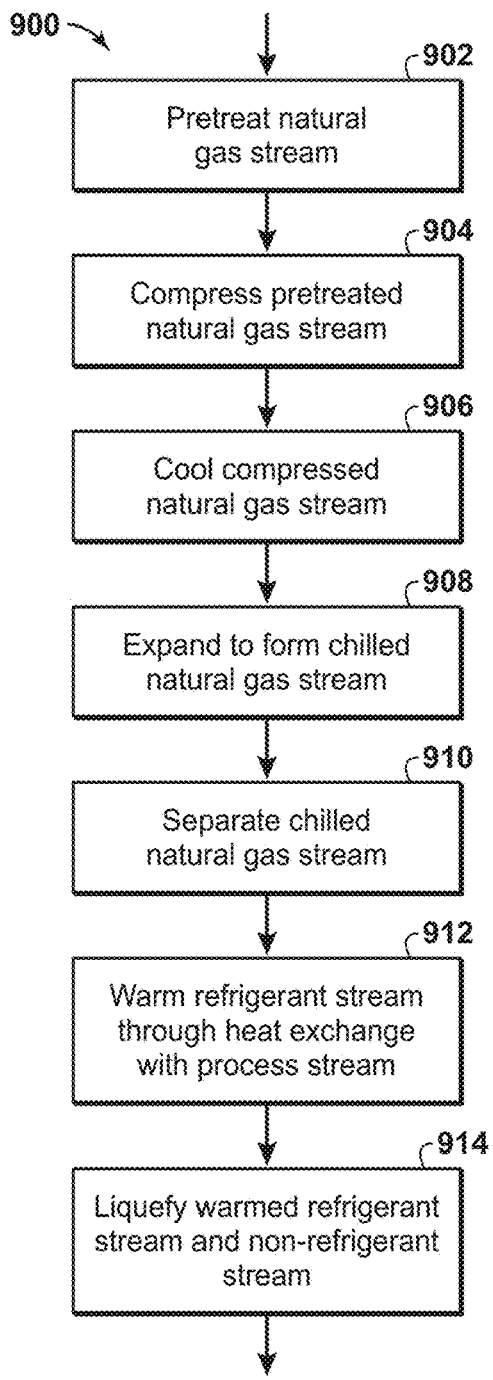
FIG. 9 is a flowchart of a method of liquefying natural gas to form LNG according to disclosed aspects.

FIG. 9 illustrates a method 900 of producing LNG according to disclosed aspects. At block 902 the natural gas stream is pretreated to generate a pretreated natural gas stream. At block 904 the pretreated natural gas stream is compressed in at least two serially arranged compressors to a pressure of at least 1,500 psia. At block 906 the compressed natural gas stream is cooled. At block 908 the cooled compressed natural gas stream is expanded in at least one work producing natural gas expander to a pressure that is less than 2,000 psia and no greater than the pressure to which the at least two serially arranged compressors compress the pretreated natural gas stream, to thereby form a chilled natural gas stream. At block 910 the chilled natural gas stream is separated into a refrigerant stream and a non-refrigerant stream. At block 912 the refrigerant stream is warmed in a heat exchanger through heat exchange with one or more process streams associated with pretreating the natural gas stream, thereby generating a warmed refrigerant stream. At block 914 the warmed refrigerant stream and the non-refrigerant stream are liquefied.

Figure 10:
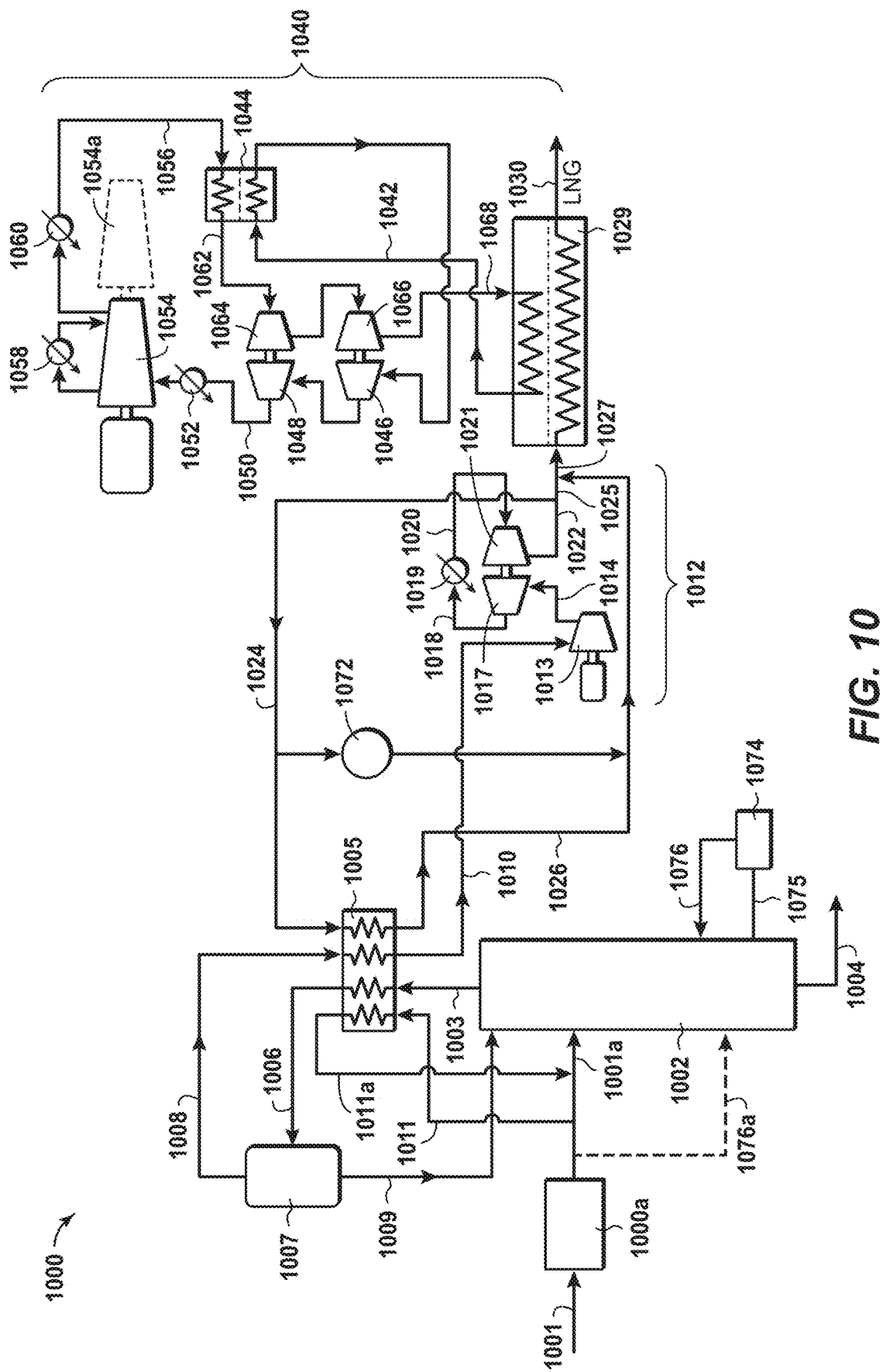
FIG. 10 is a schematic diagram of a natural gas pretreatment apparatus as well as a portion of a liquefaction module, according to disclosed aspects.

FIG. 10 is an illustration of a pretreatment apparatus 1000 for pretreating and pre-cooling a natural gas stream 1001, followed by a high pressure compression and expansion (HPCE) process module 1012, according to another aspect of the disclosure. Pretreatment apparatus 1000 may include a system for removing water or moisture from a natural gas stream, such as a molecular sieve dehydrator 1000a. While only shown in FIG. 10, it is to be understood that the aspects depicted in FIGS. 11-16 may also use some type of water/moisture removal systems, such as dehydrator 1000a. The natural gas stream 1001 then flows into a separation device, such as a scrub column 1002, where the natural gas stream 1001 is separated into a column overhead stream 1003 and a column bottom stream 1004. The column overhead stream 1003 flows through a first heat exchanger 1005, where the column overhead stream 1003 is partially condensed to form a two-phase stream 1006. The two-phase stream 1006 may flow into another separation device, such as a separator 1007, where a cold pretreated gas stream 1008 is separated from a liquid stream 1009. The cold pretreated gas stream 1008 may flow through the first heat exchanger 1005 where the cold pretreated gas stream 1008 is warmed by indirectly exchanging heat with the column overhead stream 1003, thereby forming a pretreated natural gas stream 1010. The liquid stream 1009 may be pressurized within a pump (not shown) and then directed to the scrub column 1002 as a column reflux stream. A reboiler 1074 heats a portion 1075 of the liquids extracted from the bottom of scrub column 1002 and returns the heated liquids and associated gases to the scrub column, thereby generating a stripping gas 1076 for the column. Alternatively, a stripping gas stream for the reboiler operation may be sourced from the natural gas stream 1001, as shown by dashed line 1076a.

To control the temperature of the natural gas stream 1001 entering the scrub column, a side stream 1011 of the natural gas stream 1001 may be directed to the first heat exchanger 1005 to be cooled therein and generate a cooled natural gas stream 1011a. The cooled natural gas stream 1011a is combined with the natural gas stream upstream of the scrub column 1002 to form a combined natural gas stream 1001a, as depicted in FIG. 10. The side stream may comprise 1% to 100%, or 10% to 90%, or 25% to 75%, or 40% to 60% of the natural gas stream 1001, depending on the temperature of the natural gas stream 1001 and the desired input temperature of the natural gas stream into the scrub column.

The HPCE process module 1012 may comprise a first compressor 1013 which compresses the pretreated natural gas stream 1010 to form an intermediate pressure gas stream 1014. The intermediate pressure gas stream 1014 may flow through a second heat exchanger (not shown) where the intermediate pressure gas stream 1014 is cooled by indirectly exchanging heat with the environment. The second heat exchanger may be an air cooled heat exchanger or a water cooled heat exchanger. The intermediate pressure gas stream 1014 may then be compressed within a second compressor 1017 to form a high pressure gas stream 1018. The pressure of the high pressure gas stream 1018 may be greater than 1,500 psia (10,340 kPa), or more preferably greater than 3,000 psia (20,680 kPa). The high pressure gas stream 1018 may flow through a third heat exchanger 1019 where the high pressure gas stream 1018 is cooled by indirectly exchanging heat with the environment to form a cooled high pressure gas stream 1020. The third heat exchanger 1019 may be an air cooled heat exchanger or a water cooled heat exchanger. The cooled high pressure gas stream 1020 may then be expanded within an expander 1021 to form a first chilled pretreated gas stream 1022. The pressure of the first chilled pretreated gas stream 1022 may be less than 3,000 psia (20,680 kPa), or more preferably less than 2,000 psia (13,790 kPa), and the pressure of the first chilled pretreated gas stream 1022 is less than the pressure of the cooled high pressure gas stream 1020. In a preferred aspect, the second compressor 1017 may be driven solely by the shaft power produced by the expander 1021. In other disclosed aspects, including those aspects in which the HPCE process module 1012 includes only one compressor, the expander 1021 may be connected to a generator (not shown) to generate power. The first chilled pretreated gas stream 1022 may be separated into a refrigerant stream 1024 and a non-refrigerant stream 1025. The refrigerant stream 1024 may comprise between 10% and 90%, or between 25% and 75%, or between 40% or 60% of the first pre-treated gas stream 1022. The refrigerant stream 1024 is recycled to flow through the first heat exchanger 1005 where the refrigerant stream 1024 is partially warmed by indirectly exchanging heat with the column overhead stream 1003, thereby forming a warmed refrigerant stream 1026. The warmed refrigerant stream 1026 may mix with the non-refrigerant stream 1025 to form a second chilled pretreated gas stream 1027. The second chilled pretreated gas stream 1027 may then be liquefied in, for example, a feed gas expander-based liquefaction module 1040. The feed gas expander-based liquefaction module 1040 includes a primary cooling loop, which is a closed expander-based refrigeration loop that may be charged with components from the feed gas stream. The second chilled pre-treated gas stream 1027 is liquefied through indirect heat exchange with a refrigerant stream 1042 in a cryogenic heat exchanger 1029. While the primary cooling loop of the feed gas expander-based liquefaction module is shown, it is to be understood that other portions of the liquefaction module, while not depicted, are included with the disclosure herein. The resultant LNG stream 1030 may then be stored and/or transported as needed.

Refrigerant stream 1042 is cooled in a heat exchanger 1044 and compressed in first and second refrigerant compressors 1046, 1048 to produce a compressed refrigerant stream 1050, The compressed refrigerant stream 1050 is cooled in a pre-compression heat exchanger 1052, which employs ambient-temperature air, water, or other coolant as is known in the art. The compressed refrigerant stream is then further compressed in a third refrigerant compressor 1054 and becomes a further compressed refrigerant stream 1056. Additional refrigerant compressors 1054a may be employed if necessary. In an aspect the third refrigerant compressor is powered by a gas turbine 1055. The further compressed refrigerant stream may be cooled by an intercooling heat exchanger 1058 and a post-compression heat exchanger 1060, and used to warm refrigerant stream 1042 in heat exchanger 1044. The cooled compressed refrigerant stream 1062 is then expanded in first and second refrigerant expanders 1064, 1066, to produce an expanded refrigerant stream 1068. In an aspect the first and second refrigerant expanders are connected to first and second refrigerant compressors 1046, 1048, respectively. In a preferred aspect, the first and second refrigerant compressors 1046, 1048 may be driven solely by the shaft power produced by the first and second refrigerant expanders 1064, 1066, respectively. The expanded refrigerant stream 1068 is directed to the cryogenic heat exchanger 1029, where it provides the cooling energy necessary to liquefy the second chilled pre-treated gas stream 1027 to produce the LNG stream 1030. The expanded refrigerant stream 1068 is warmed inside the cryogenic heat exchanger 1029 to form the refrigerant stream 1042, which is cycled through the feed gas expander-based liquefaction module 1040 in a closed-loop fashion as described herein and depicted in FIG. 10.

The refrigerant stream 1024 may be used to cool or chill any of the process streams associated with the pretreatment apparatus 1000. For example, one or more of the column overhead stream 1003, the two-phase stream 1006, the cold pretreated gas stream 1008, the liquid stream 1009, and the pretreated natural gas stream 1010 may be configured to exchange heat with the refrigerant stream 1024. Furthermore, other process streams or cooling needs not associated with the pretreatment apparatus 1000, and represented symbolically at 1072, may be cooled through heat exchange with the refrigerant stream 1024 as desired in terms of process location and/or cost. For example, the cooling need 1072 may include pre-chilling the natural gas stream prior to the natural gas stream entering the dehydrator 1000a to assist in dehydration operations. This is advantageous because it is not necessary to take a slipstream from liquefaction module 1040 to perform the same function, and the liquefaction module 1040 and the pretreatment apparatus 1000 can be independently controlled. As an additional benefit, the refrigerant stream 1024 may be used during start-up operations to cool the pretreatment apparatus 1000. The refrigerant stream 1024 may be split into two or more sub-streams that are used to cool various process streams.

Figure 11:
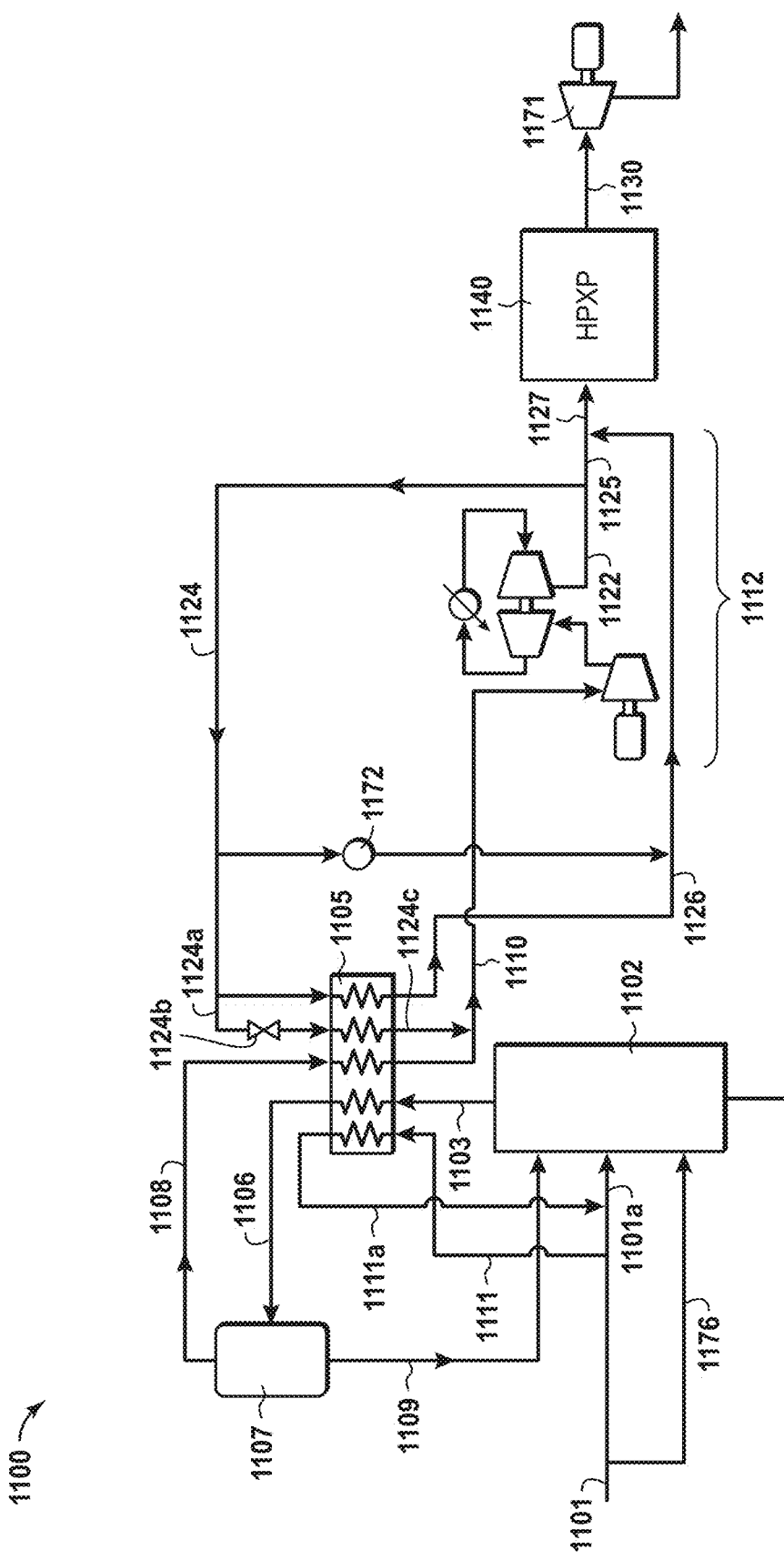
FIG. 11 is a schematic diagram of a natural gas pretreatment apparatus and a liquefaction module according to disclosed aspects.

FIG. 11 is an illustration of a pretreatment apparatus 1100 for pretreating and pre-cooling a natural gas stream 1101, followed by a high pressure compression and expansion (HPCE) process module 1112, according to another aspect of the disclosure. Apparatus 1100 is similar to apparatus 1000, and similar elements are labeled with similar reference numbers. Like apparatus 1000, apparatus 1100 includes a scrub column 1102, a first heat exchanger 1105, and a separator 1107. To control the temperature of the natural gas stream 1101 entering the scrub column, a side stream 1111 of the natural gas stream 1101 may be directed to the first heat exchanger 1105 to be cooled therein and form a cooled natural gas stream 1111a. The cooled natural gas stream 1111a is combined with the natural gas stream upstream of the scrub column 1102 to form a combined natural gas stream 1101a, as depicted in FIG. 11. The side stream may comprise 1% to 100%, or 10% to 90%, or 25% to 75%, or 40% to 60% of the natural gas stream 1101, depending on the temperature of the natural gas stream 1101 and the desired input temperature of the natural gas stream into the scrub column.

The combined natural gas stream 1101a flows into scrub column 1102 and is separated into a column overhead stream 1103 and a column bottom stream 1104. The column overhead stream 1103 flows through first heat exchanger 1105 to be partially condensed and forming a two-phase stream 1106. The two-phase stream 1106 flows into separator 1107 and is separated into a cold pretreated gas stream 1108 and a liquid stream 1109. The cold pretreated gas stream 1108 flows through the first heat exchanger 1105 and is warmed by indirectly exchanging heat with the column overhead stream 1103, thereby forming a pretreated natural gas stream 1110. The liquid stream 1109 may be pressurized within a pump (not shown) and then directed to the scrub column 1102 as a column reflux stream. A stripping gas stream 1176 for the reboiler operation may be sourced from the natural gas stream 1001; alternatively, a reboiler as shown in FIG. 10 may be used to provide the stripping gas for the scrub column.

Pretreated natural gas stream 1110 is input into an HPCE process module 1112, which is similar to HPCE process module 1012 and will not be further described. The output of HPCE process module 1112 is a first chilled pretreated gas stream 1122, which is separated into a refrigerant stream 1124 and a non-refrigerant stream 1125. The refrigerant stream 1124 may comprise between 10% and 90%, or between 25% and 75%, or between 40% or 60% of the first pre-treated gas stream 1122. The refrigerant stream 1124 is recycled to flow through the first heat exchanger 1105 to be warmed by indirectly exchanging heat with the column overhead stream 1103, thereby forming a warmed refrigerant stream 1126. A side stream 1124a of the refrigerant stream 1124 may be directed to a pressure-reducing and temperature-reducing device such as a Joule-Thomson valve 1124b to produce a further cooled refrigerant stream, which is also directed to flow through the first heat exchanger 1105 to cool the column overhead stream 1103 and any other process streams flowing therethrough. The resulting warmed side stream 1124c is combined with the pretreated natural gas stream 1110. The warmed refrigerant stream 1126 may mix with the non-refrigerant stream 1125 to form a second chilled pretreated gas stream 1127. The second chilled pretreated gas stream 1127 may then be liquefied in, for example, a feed gas expander-based liquefaction module 1140, to produce an LNG stream 1130. Module 1140 may be similar to module 1040, and therefore will not be further described. An expander 1171 may be employed to reduce the pressure and temperature of LNG stream 1130, to thereby produce a sub-cooled LNG stream suitable for storage and transport.

The refrigerant stream 1124 may be used to cool or chill any of the process streams associated with the pretreatment apparatus 1100. For example, one or more of the column overhead stream 1103, the two-phase stream 1106, the cold pretreated gas stream 1108, the liquid stream 1109, and the pretreated natural gas stream 1110 may be configured to exchange heat with the refrigerant stream 1124. Furthermore, other process streams or cooling needs not associated with the pretreatment apparatus 1100, and represented symbolically at 1172, may be cooled through heat exchange with the refrigerant stream 1124 as desired in terms of process location and/or cost. The refrigerant stream 1124 may be split into two or more sub-streams that are used to cool various process streams.

Figure 12:
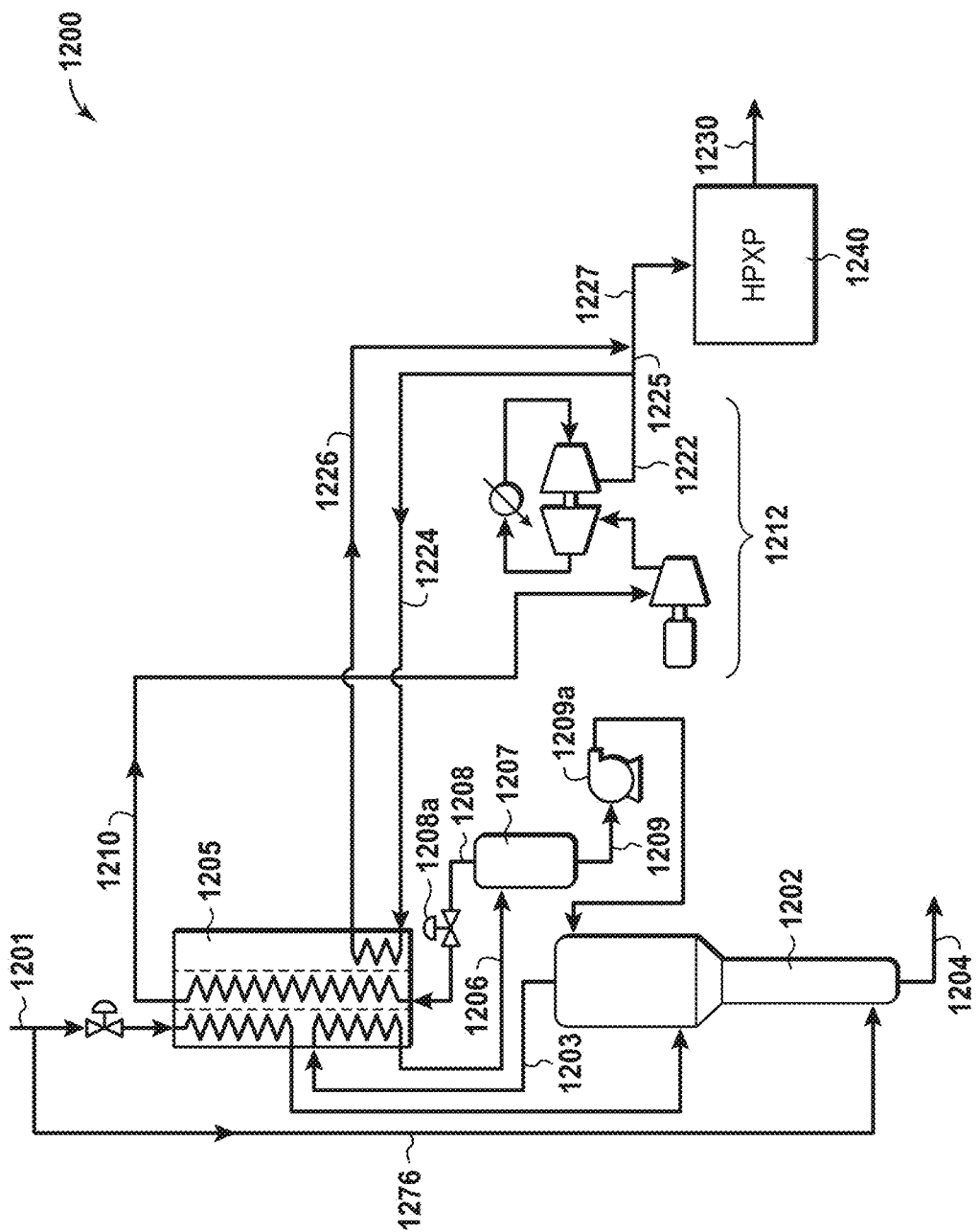
FIG. 12 is a schematic diagram of a natural gas pretreatment apparatus and a liquefaction module according to disclosed aspects.

FIG. 12 depicts a pretreatment apparatus 1200 for pretreating and pre-cooling a natural gas stream 1201, followed by a high pressure compression and expansion (HPCE) process module 1212 (similar to module 1112) and a feed gas expander-based liquefaction module 1240 (similar to module 1140), to produce an LNG stream 1230. Apparatus 1200 is similar to apparatus 1100, and similar elements are labeled with similar reference numbers. A natural gas stream 1201 flows into a first heat exchanger 1205 to be partially condensed, and is then sent to a scrub column 1202 to be separated into a column overhead stream 1203 and a column bottom stream 1204. The column overhead stream 1203 flows through the first heat exchanger 1205 to be partially condensed and forming a two-phase stream 1206. The two-phase stream 1206 flows into a separator 1207 and is separated into a cold pretreated gas stream 1208 and a liquid stream 1209. The cold pretreated gas stream 1208 optionally flows through a Joule-Thompson (J-T) valve 1208a, and then flows through the first heat exchanger 1205, where it is warmed by indirectly exchanging heat with the column overhead stream 1203 to form a pretreated natural gas stream 1210. The liquid stream 1209 may be pressurized within a pump 1209a and then directed to the scrub column 1202 as a column reflux stream. A stripping gas stream 1276 for the reboiler operation may be sourced from the natural gas stream; alternatively, a reboiler as shown in FIG. 10 may be used to provide the stripping gas for the scrub column.

Pretreated natural gas stream 1210 is input into an HPCE process module 1212, which is similar to HPCE module 1012 and will not be further described. The output of HPCE process module 1212 is a first chilled pretreated gas stream 1222, which is separated into a refrigerant stream 1224 and a non-refrigerant stream 1225. The refrigerant stream 1224 may comprise between 10% and 90%, or between 25% and 75%, or between 40% or 60% of the first chilled pre-treated gas stream 1222. The refrigerant stream 1224 is recycled to flow through the first heat exchanger 1205 to be warmed by indirectly exchanging heat with the column overhead stream 1203, thereby forming a warmed refrigerant stream 1226. The warmed refrigerant stream 1226 may mix with the non-refrigerant stream 1225 to form a second chilled pre-treated gas stream 1227. The second chilled pretreated gas stream 1227 may then be liquefied in, for example, a feed gas expander-based liquefaction module 1240, to produce an LNG stream 1230. The J-T valve 1208a is used when the temperature of 1224 is not low enough to provide sufficient cooling energy to the heat exchanger 1205.

Figure 13:
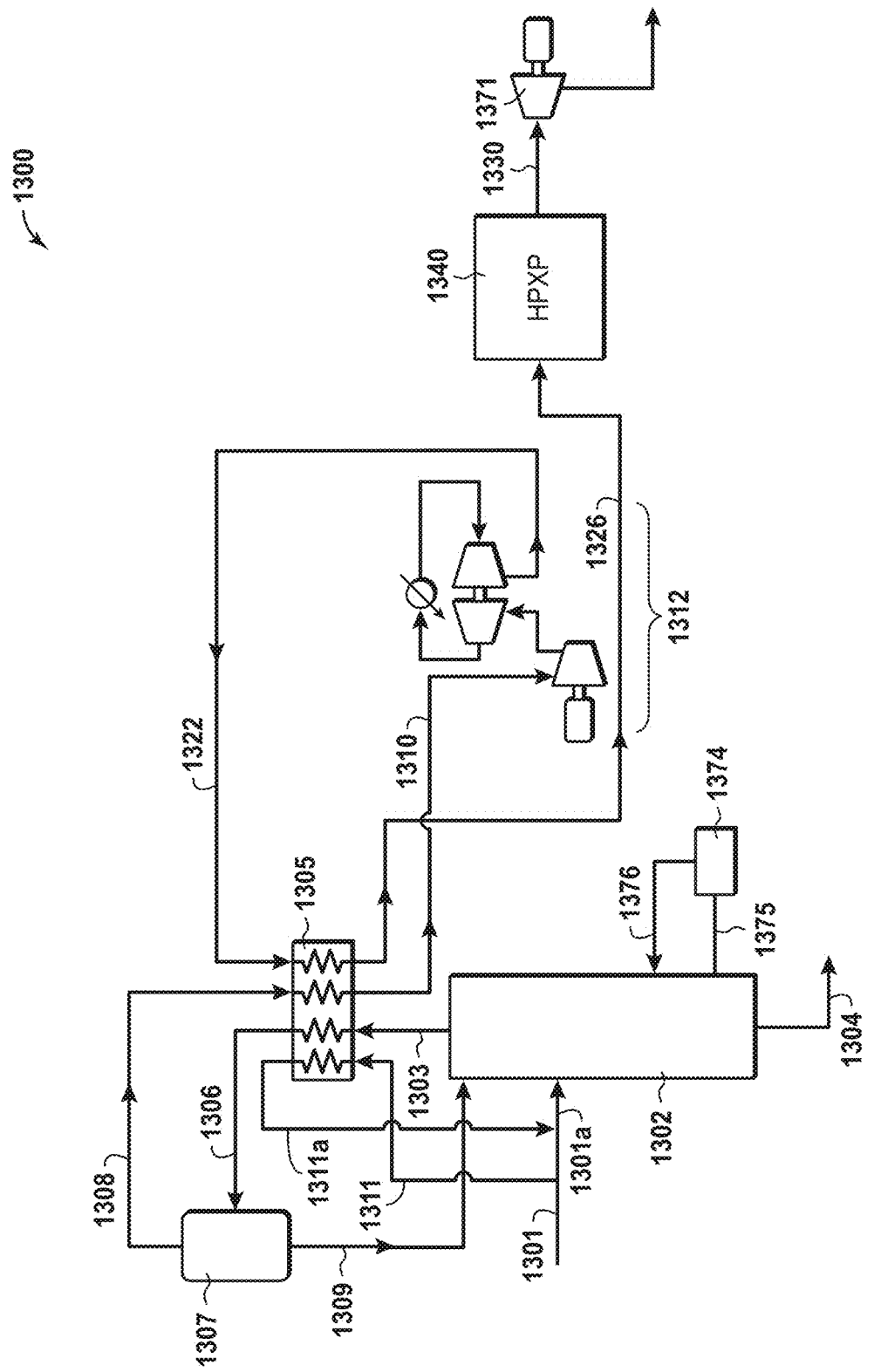
FIG. 13 is a schematic diagram of a natural gas pretreatment apparatus and a liquefaction module according to disclosed aspects.

FIG. 13 depicts a pretreatment apparatus 1300 for pre-treating and pre-cooling a natural gas stream 1301, followed by a high pressure compression and expansion (HPCE) process module 1312 (similar to modules 1012, 1112, and 1212) and a feed gas expander-based liquefaction module 1340 (similar to modules 1040, 1140, and 1240), to produce an LNG stream 1330. Apparatus 1300 is similar to apparatus 1000, and similar elements are labeled with similar reference numbers. Like apparatus 1000, apparatus 1300 includes a scrub column 1302, a first heat exchanger 1305, and a separator 1307. To control the temperature of the natural gas stream 1301 entering the scrub column, a side stream 1311a of the natural gas stream 1301 may be directed to the first heat exchanger 1305 to be cooled therein and form a cooled natural gas stream 1311a. The cooled natural gas stream 1311a is combined with the natural gas stream upstream of the scrub column 1302 to form a combined natural gas stream 1301a, as depicted in FIG. 13. The side stream may comprise 1% to 100%, or 10% to 90%, or 25% to 75%, or 40% to 60% of the natural gas stream 1301, depending on the temperature of the natural gas stream 1301/1301a and the desired input temperature of said natural gas stream into the scrub column.

The combined natural gas stream 1301a flows into scrub column 1302 and is separated into a column overhead stream 1303 and a column bottom stream 1304. The column overhead stream 1303 flows through first heat exchanger 1305 to be partially condensed and forming a two-phase stream 1306. The two-phase stream 1306 flows into separator 1307 and is separated into a cold pretreated gas stream 1308 and a liquid stream 1309. The cold pretreated gas stream 1308 flows through the first heat exchanger 1305 and is warmed by indirectly exchanging heat with the column overhead stream 1303, thereby forming a pretreated natural gas stream 1310. The liquid stream 1309 may be pressurized within a pump (not shown) and then directed to the scrub column 1302 as a column reflux stream. A reboiler 1374 heats a portion 1375 of the liquids extracted from the bottom of scrub column 1302 and returns the heated liquids and associated gases to the scrub column, thereby generating a stripping gas 1376 for the column. Alternatively, a stripping gas stream for the reboiler operation may be sourced from the natural gas stream 1001, as previously described.

Pretreated natural gas stream 1310 is input into an HPCE process module 1312, which is similar to HPCE process module 1012 and will not be further described. The output of HPCE process module 1312 is a chilled pretreated gas stream 1322, all of which is recycled to flow through the first heat exchanger 1305 to be warmed by indirectly exchanging heat with the column overhead stream 1303, thereby forming a warmed refrigerant stream 1326. The warmed refrigerant stream 1326 may then be liquefied in, for example, a feed gas expander-based liquefaction module 1340, to produce an LNG stream 1330. Module 1340 may be similar to module 1040, and therefore will not be further described. An expander 1371 may be employed to reduce the pressure and temperature of LNG stream 1330 and produce a sub-cooled LNG stream suitable for storage and transport.

Figure 14:
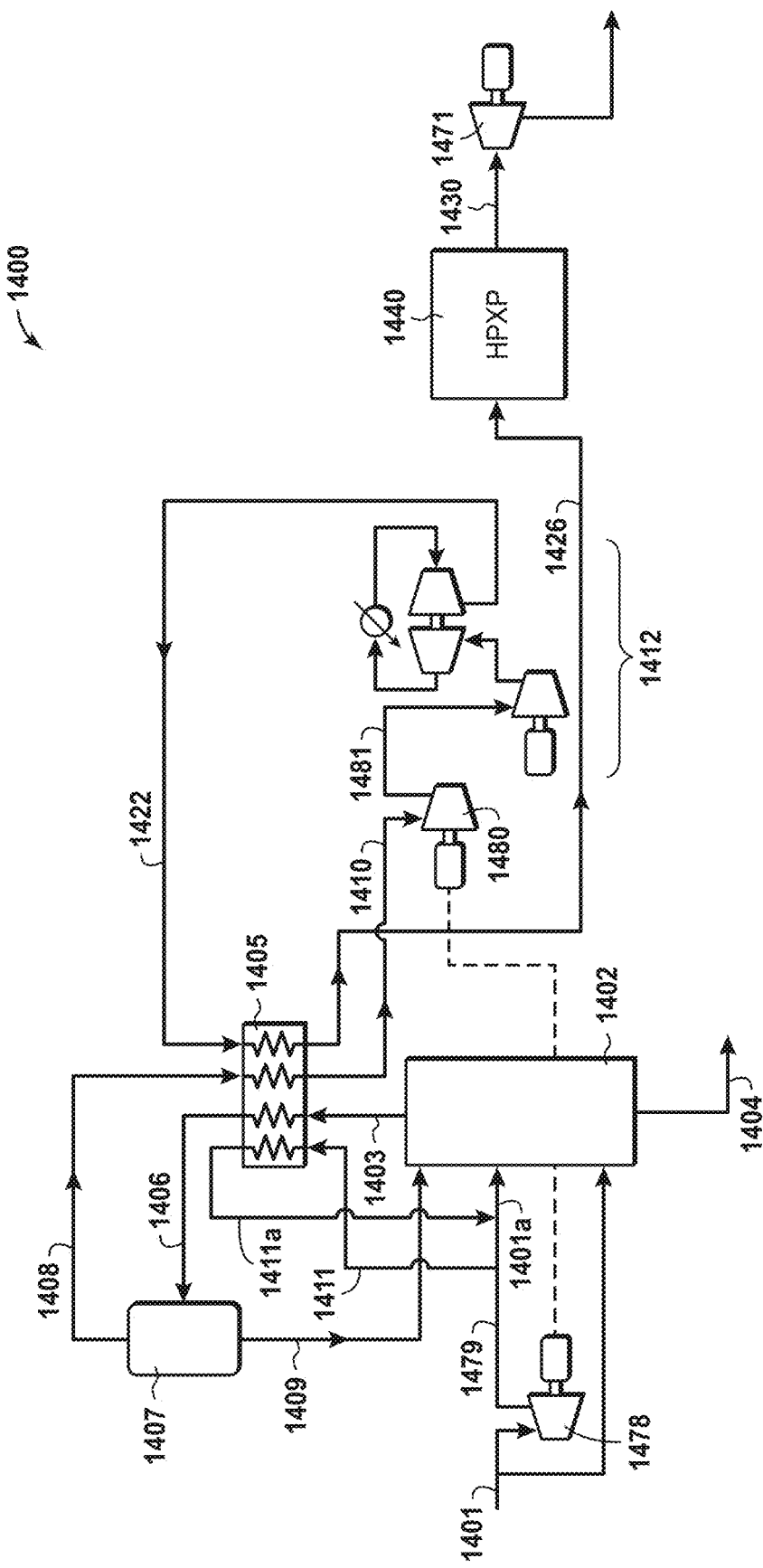
FIG. 14 is a schematic diagram of a natural gas pretreatment apparatus and a liquefaction module according to disclosed aspects.

FIG. 14 depicts a pretreatment apparatus 1400 for pre-treating and pre-cooling a natural gas stream 1401, followed by a high pressure compression and expansion (HPCE) process module 1412, according to another aspect of the disclosure. Apparatus 1400 is similar to apparatus 1100, and similar elements will be labeled with similar reference numbers. Like apparatus 1100, apparatus 1400 includes a scrub column 1402, a first heat exchanger 1405, and a separator 1407. A natural gas stream 1401 is expanded and cooled by a feed gas expander 1478 to form an expanded natural gas stream 1479. The expanded natural gas stream flows into scrub column 1402 and is separated into a column overhead stream 1403 and a column bottom stream 1404. The column overhead stream 1403 flows through first heat exchanger 1405 to be partially condensed and forming a two-phase stream 1406. The two-phase stream 1406 flows into separator 1407 and is separated into a cold pretreated gas stream 1408 and a liquid stream 1409. The cold pretreated gas stream 1408 flows through the first heat exchanger 1405 and is warmed by indirectly exchanging heat with the column overhead stream 1403, thereby forming a pretreated natural gas stream 1410. The liquid stream 1409 may be pressurized within a pump (not shown) and then directed to the scrub column 1402 as a column reflux stream. A stripping gas stream 1476 for the reboiler operation may be sourced from the natural gas stream 1401; alternatively, a reboiler as shown in FIG. 10 may be used to provide the stripping gas for the scrub column.

Pretreated natural gas stream 1410 is compressed in a feed gas compressor 1480 to form a compressed pretreated natural gas stream 1481, which is input into an HPCE process module 1412. The HPCE process module 1412 is similar to HPCE process module 1012 and will not be further described. Feed gas compressor 1480 may be powered by a gas turbine, or preferably, may be powered by a power output of the feed gas expander 1478. The output of HPCE process module 1412 is a chilled pretreated gas stream 1422, all of which is recycled to flow through the first heat exchanger 1405 to be warmed by indirectly exchanging heat with the column overhead stream 1403, and thereby forming a warmed refrigerant stream 1426. The warmed refrigerant stream 1426 then be liquefied in, for example, a feed gas expander-based liquefaction module 1140, to produce an LNG stream 1430. Module 1440 may be similar to module 1040 and therefore will not be further described. An expander 1471 may be employed to reduce the pressure and temperature of LNG stream 1430, to thereby produce a sub-cooled LNG stream suitable for storage and transport.

To control the temperature of the natural gas stream 1401 entering the scrub column, a side stream 1411 of the natural gas stream 1401 (or expanded natural gas stream 1479) may be directed to the first heat exchanger 1405 to be cooled therein and form a cooled natural gas stream 1411a. The cooled natural gas stream 1411a is combined with the natural gas stream upstream of the scrub column 1402 to form a combined natural gas stream 1401a, as depicted in FIG. 14. The side stream may comprise 1% to 100%, or 10% to 90%, or 25% to 75%, or 40% to 60% of the natural gas stream 1401/expanded natural gas stream 1479, depending on the temperature of the natural gas stream 1401/expanded natural gas stream 1479 and the desired input temperature of the natural gas stream into the scrub column.

Figure 15:
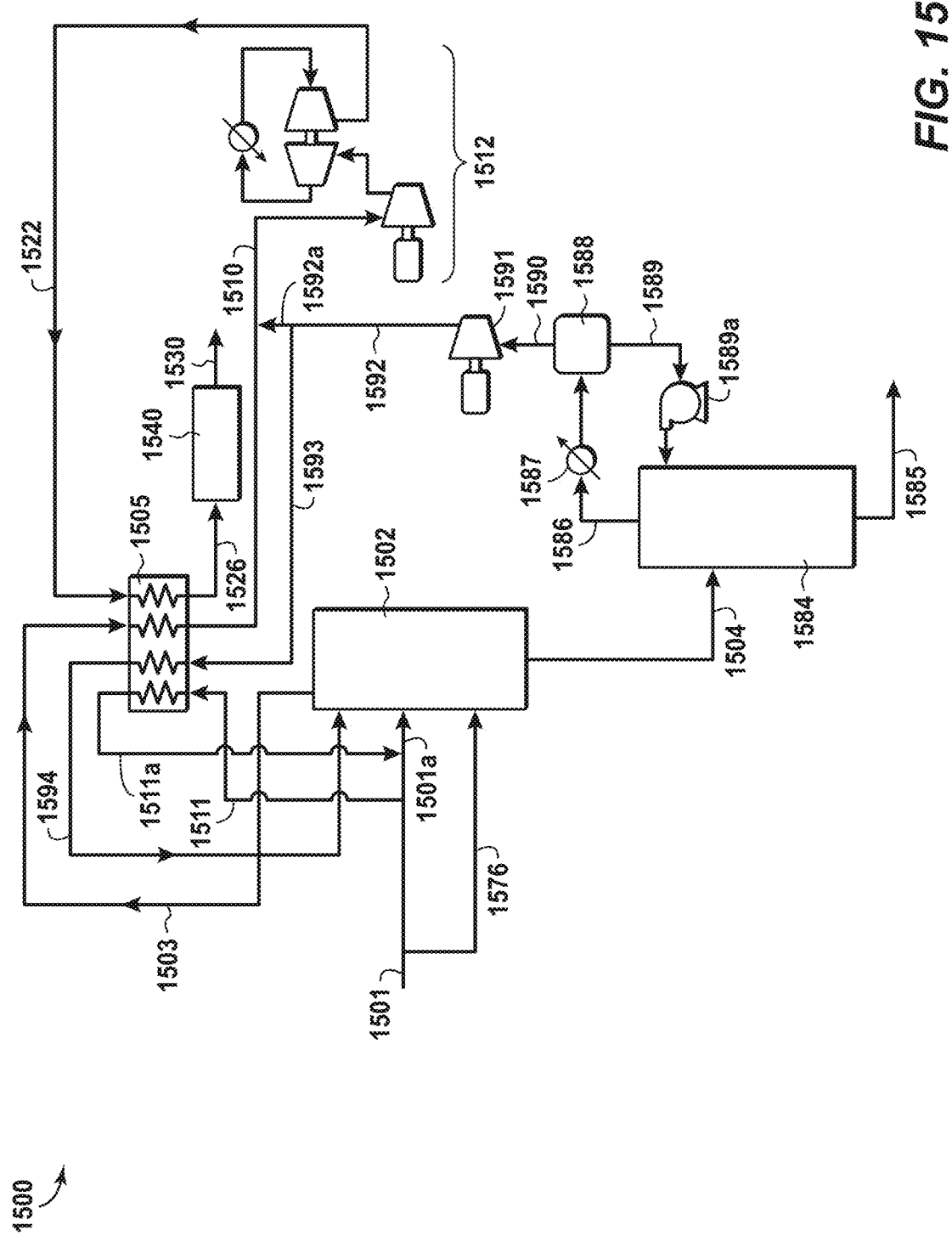
FIG. 15 is a schematic diagram of a natural gas pretreatment apparatus and a liquefaction module according to disclosed aspects.

FIG. 15 depicts a pretreatment apparatus 1500 for pretreating and pre-cooling to a natural gas stream 1501, followed by a high pressure compression and expansion (HPCE) process module 1512, according to another aspect of the disclosure. Apparatus 1500 is similar in some respects to apparatus 1100, and similar elements are labeled with similar reference numbers. Like apparatus 1100, apparatus 1500 includes a scrub column 1502 and a first heat exchanger 1505 but does not include a separator to which a cooled vapor stream from the scrub column is directed. Instead, a side stream 1511 of the natural gas stream 1501 may be directed to the first heat exchanger 1505 to be cooled therein and form a cooled natural gas stream 1511a. The cooled natural gas stream 1511a is combined with the natural gas stream upstream of the scrub column 1502 to produce a combined natural gas stream 1501a, as depicted in FIG. 15. The side stream may comprise 1% to 100%, or 10% to 90%, or 25% to 75%, or 40% to 60% of the natural gas stream 1501, depending on the temperature of the natural gas stream 1501 and the desired input temperature of the natural gas stream into the scrub column 1502. The combined natural gas stream 1501a flows into scrub column 1502 and is separated into a column overhead stream 1503, which may be called a separated natural gas stream, and a column bottom stream 1504. The column bottom stream 1504 is directed to a stabilizer 1584. The stabilizer removes light hydrocarbons from the column bottom stream 1504, which is separated into a stabilizer overhead stream 1586 and a stabilized hydrocarbons liquid stream 1585. The stabilized hydrocarbons liquid stream 1585 is stable at normal storage conditions and is salable as stabilized condensate. The stabilizer overhead stream 1586 is cooled in a reflux cooler 1587 and directed to a reflux separator 1588, where it is separated into a reflux liquid stream 1589 and a recycle gas stream 1590. The reflux liquid stream 1589 may be pumped by pump 1589a, and is returned to the stabilizer 1584. The reflux liquid stream functions to wash down any heavy hydrocarbons from upflowing gas in the stabilizer. The recycle gas stream 1590 is compressed in a recycle compressor 1591 to form a compressed recycle gas stream 1592. According to disclosed aspects the recycle compressor 1591 has a much smaller capacity (e.g., 0.5 MW) than the compressors in the HPCE process module 1512. In other words, the recycle compressor 1591 may have a compression capacity of less than or equal to 0.5%, or greater than 0.5% but less than or equal to 1%, or greater than 1% but less than or equal to 5%, of the total compression power of the LNG plant. A first portion 1593 of the compressed recycle gas stream 1592 passes through the first heat exchanger 1505, where it is cooled to be partially or fully condensed, thereby forming a cooled compressed recycle gas stream 1594. The cooled compressed recycle gas stream 1594 is directed to the scrub column 1502 as a column reflux stream. A reflux drum (not shown) may be placed in line 1594 to provide a buffer for the column reflux stream entering the scrub column. A stripping gas stream 1576 for the reboiler operation may be sourced from the natural gas stream 1001; alternatively, a reboiler as shown in FIG. 10 may be used to provide the stripping gas for the scrub column.

The column overhead stream 1503 flows through first heat exchanger 1505, thereby forming a pretreated natural gas stream 1510. The pretreated natural gas stream 1510 is combined with a second portion 1592a of the compressed recycle gas stream 1592 and input into an HPCE process module 1512, which is similar to HPCE process module 1012 and will not be further described. The output of HPCE process module 1512 is a chilled pretreated gas stream 1522, all of which is recycled to flow through the first heat exchanger 1505 to be warmed by indirectly exchanging heat with the first portion 1593, thereby forming a warmed refrigerant stream 1526. The warmed refrigerant stream 1526 may then be liquefied in, for example, a feed gas expander-based liquefaction module 1540, to produce an LNG stream 1530. Module 1540 may be similar to module 1040 in FIG. 10 and therefore will not be further described.

Figure 16A:
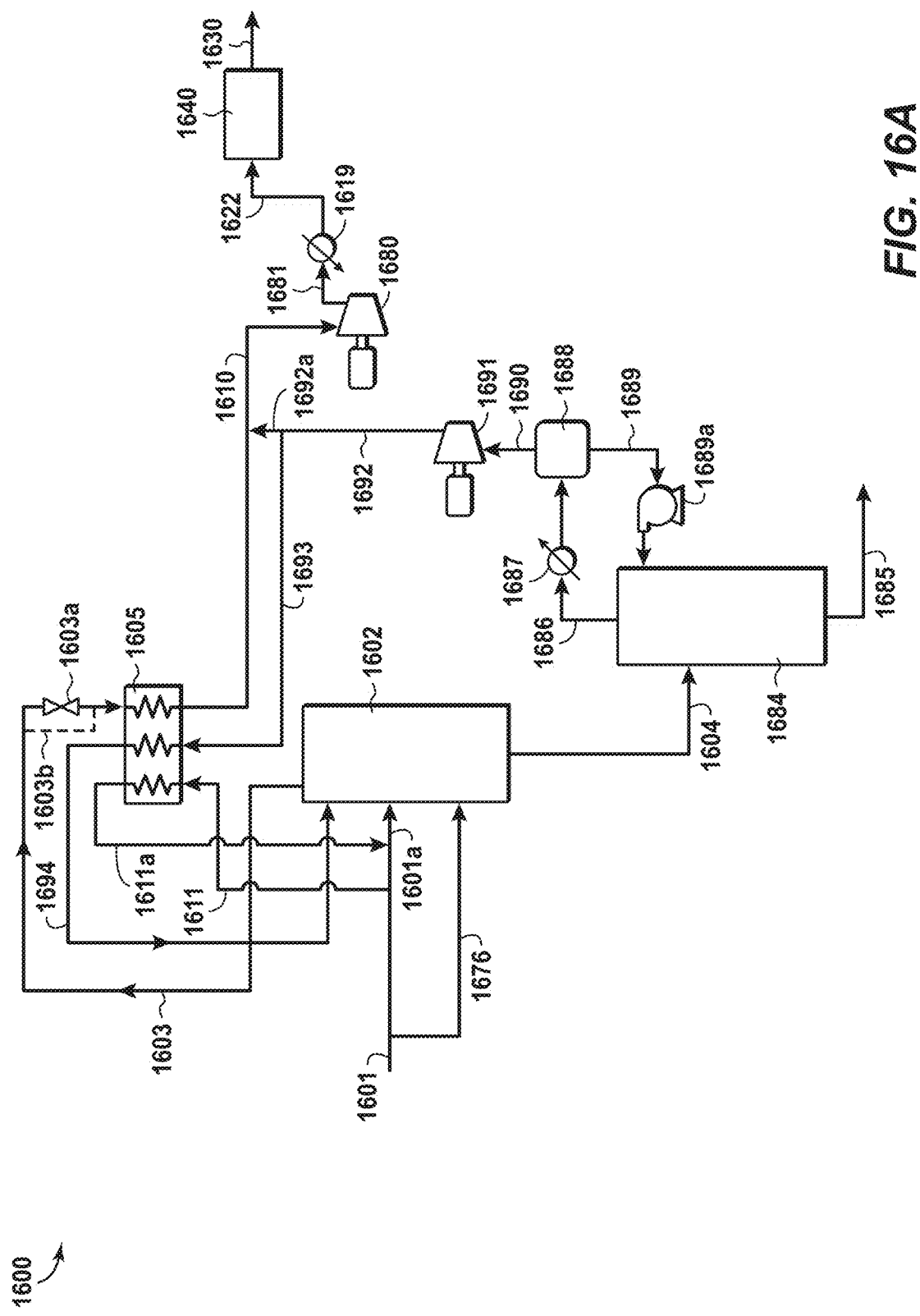
FIG. 16A is a schematic diagram of a natural gas pretreatment apparatus and a liquefaction module according to disclosed aspects.
Figure 16B:
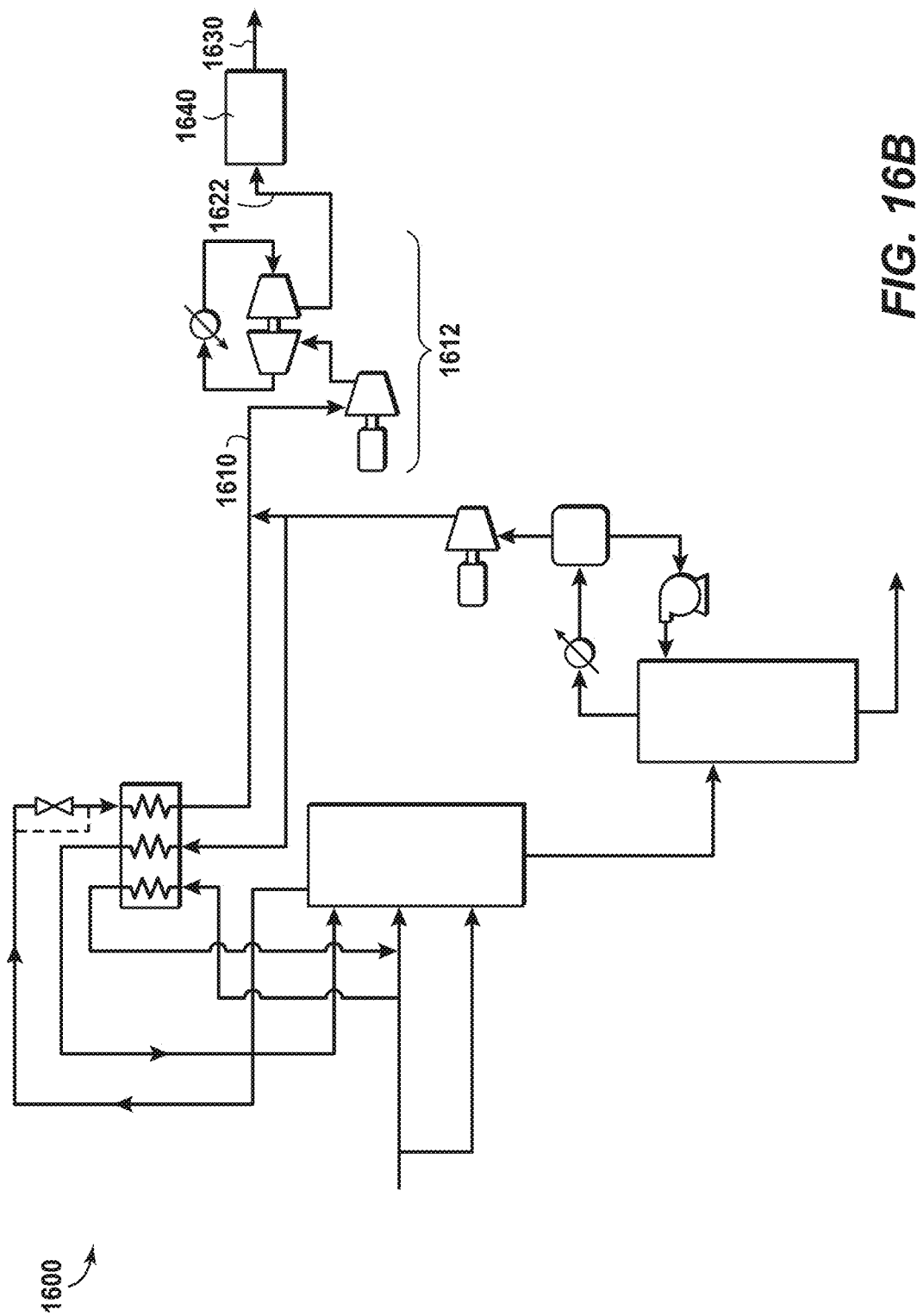
FIG. 16B is a schematic diagram of a natural gas pretreatment apparatus and a liquefaction module according to disclosed aspects.

FIG. 16 depicts a pretreatment apparatus 1600 for pretreating and pre-cooling a natural gas stream 1601, followed by a high pressure compression and expansion (HPCE) process module 1612, according to another aspect of the disclosure. Apparatus 1600 is similar in some respects to apparatus 1500, and similar elements are labeled with similar reference numbers. Like apparatus 1500, apparatus 1600 includes a scrub column 1602 and a first heat exchanger 1605 but does not include a separator to which a cooled vapor stream from the scrub column is directed. Instead, a side stream 1611 of the natural gas stream 1601 may be directed to the first heat exchanger 1605 to be cooled therein and form a cooled natural gas stream 1611a. The cooled natural gas stream 1611a is combined with the natural gas stream upstream of the scrub column 1602 to produce a combined natural gas stream 1601a, as depicted in FIG. 16. The side stream may comprise 1% to 100%, or 10% to 90%, or 25% to 75%, or 40% to 60% of the natural gas stream 1601, depending on the temperature of the natural gas stream 1601 and the desired input temperature of the natural gas stream into the scrub column 1602. The combined natural gas stream 1601a flows into scrub column 1602 and is separated into a column overhead stream 1603, which may be called a separated natural gas stream, and a column bottom stream 1604. The column bottom stream 1604 is directed to a stabilizer 1684. The stabilizer removes light hydrocarbons from the column bottom stream 1604, which is separated into a stabilizer overhead stream 1686 and a stabilized hydrocarbons liquid stream 1685. The stabilized hydrocarbons liquid stream 1685 is stable at normal storage conditions and is salable as stabilized condensate. The stabilizer overhead stream 1686 is cooled in a reflux cooler 1687 and directed to a reflux separator 1688, where it is separated into a reflux liquid stream 1689 and a recycle gas stream 1690. The reflux liquid stream 1689 may be pumped by pump 1689a, and is returned to the stabilizer 1684. The reflux liquid stream functions to wash down any heavy hydrocarbons from upflowing gas in the stabilizer. The recycle gas stream 1690 is compressed in a recycle compressor 1691 to form a compressed recycle gas stream 1692. According to disclosed aspects the recycle compressor 1691 has a much smaller capacity (e.g., 0.5 MW) than the compressors in the HPCE process module 1612. In other words, the recycle compressor 1691 may have a compression capacity of less than or equal to 0.5%, or greater than 0.5% but less than or equal to 1%, or greater than 1% but less than or equal to 5%, of the total compression power of the LNG plant. A first portion 1693 of the compressed recycle gas stream 1692 passes through the first heat exchanger 1605, where it is cooled to be partially or fully condensed, thereby forming a cooled compressed recycle gas stream 1694. The cooled compressed recycle gas stream 1694 is directed to the scrub column 1602 as a column reflux stream. A reflux drum (not shown) may be placed in line 1694 to provide a buffer for the column reflux stream entering the scrub column. A stripping gas stream 1676 for the reboiler operation may be sourced from the natural gas stream 1001;

alternatively, a reboiler as shown in FIG. 10 may be used to provide the stripping gas for the scrub column.

Figure 17:
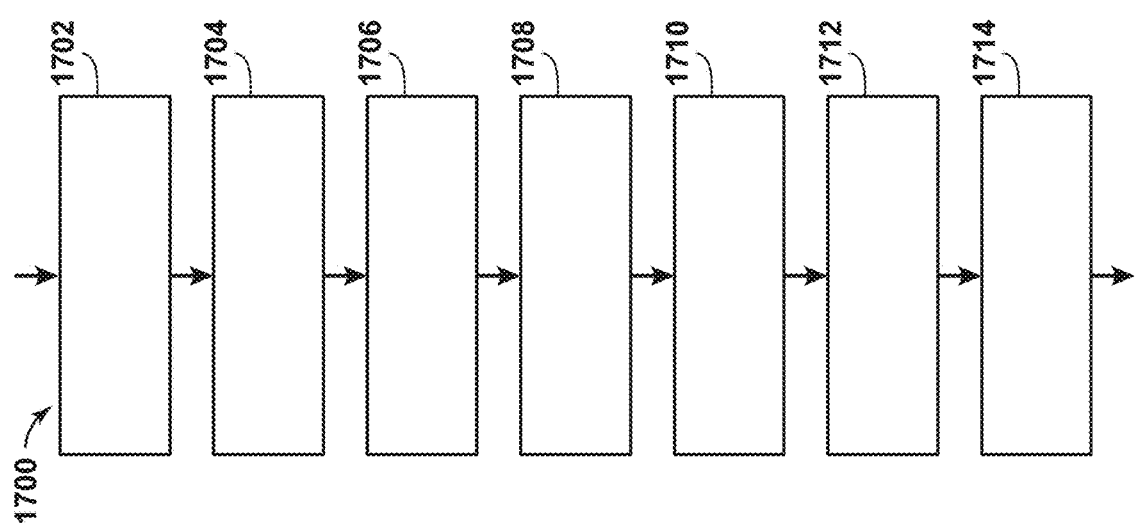
FIG. 17 is a flowchart depicting a method of producing liquefied natural gas according to disclosed aspects.

The pressure of the column overhead stream 1603 is reduced using a pressure-reducing device such as a Joule-Thomson valve 1603a, and the column overhead stream 1603 then flows through first heat exchanger 1605, thereby forming a pretreated natural gas stream 1610. The pretreated natural gas stream 1610 is combined with a second portion 1692a of the compressed recycle gas stream 1692 and is compressed in a feed gas compressor 1680 to form a compressed pretreated natural gas stream 1681. The feed gas compressor 1680 may be turbine-driven or motor-driven. The compressed pretreated natural gas stream 1681 may flow through a second heat exchanger 1619 to be cooled by indirectly exchanging heat with the ambient environment to form a cooled high pressure gas stream 1622. The second heat exchanger may be an air cooled heat exchanger or a water cooled heat exchanger. Because the Joule-Thomson valve 1603a reduces the pressure of the column overhead stream 1603, no expander (such as expander 1021) is required as disclosed in FIG. 15. Instead, the cooled high pressure gas stream 1622 is liquefied in, for example, a feed gas expander-based liquefaction module 1640, to produce an LNG stream 1630. Module 1640 may be similar to module 1040 in FIG. 10 and therefore will not be further described. Alternatively, as shown in FIG. 17, an HPCE module 1712 may be employed to compress and cool the pretreated natural gas stream 1610 prior to liquefying the cooled high pressure gas stream 1622 in the liquefaction module 1640. HPCE module 1712 is similar in structure to HPCE module 1012 and will not be further described.

It should be noted that in some circumstances, the first portion 1693 of the compressed recycle gas stream may have a higher concentration of heavy hydrocarbons (i.e., $C_{5+}$) than the column overhead stream 1603, and in such cases it would not be necessary to reduce the pressure of the column overhead stream 1603 with a Joule-Thomson valve 1603a. Disclosed aspects may include eliminating Joule-Thomson valve 1603a, or alternatively, including a valve bypass line 1603b that selectively bypasses the Joule-Thomson valve as desired.

While the aspects disclosed in FIGS. 15-17 and described above may require a small additional compressor (e.g., 1591, 1691) and may not work well for very lean gas (i.e., less than 2% contaminants), the aspects disclosed in FIGS. 15-17 provide for higher LNG production than various other disclosed aspects. Furthermore, the separator shown in FIGS. 10-14 by reference numbers 1007, 1107, 1207, 1307, 1407 may be used in FIGS. 15-17 as a reflux drum (not shown), receiving stream 1594, 1694 before connecting to the scrub column 1502, 1602. Such a reflux drum provides buffering time and control for reflux liquid feeding the scrub column. The stabilizer, which is not shown in the other disclosed aspects but may nonetheless used in any of the disclosed aspects to produce stabilized condensate as a salable stream, is additionally employed in FIG. 16 to obtain a reflux stream for the scrub column.

The aspects depicted in FIGS. 10-17 and described herein have employed feed gas expander-based liquefaction technologies or trains as an example technology that can be used to liquefy the natural gas. However, the disclosed aspects are equally effective when employing other types of liquefaction trains or technologies, such as single mixed refrigerant (SMR), dual mixed refrigerant (DMR), expander-based technologies using nitrogen, or other liquefaction techniques. Such liquefaction techniques are considered to be within the scope of the disclosed aspects. Additionally, the aspects disclosed herein can be used in any LNG liquefaction location, they have especial utility in circumstances where space is at a premium for LNG liquefaction, such as offshore liquefaction, onshore remote facilities, and the like. Additionally, any of the disclosed aspects may provide additional cooling for the first heat exchanger generated by reducing the pressure and temperature of part or all of the recycled refrigerant stream using, for example, a Joule-Thomson valve, as shown in FIG. 11 at 1124b.

FIG. 17 is a flowchart depicting a method 1700 of producing liquefied natural gas (LNG) from a natural gas stream according to disclosed aspects. At block 1702 a portion of the natural gas stream is cooled in a first heat exchanger to generate a cooled natural gas stream. At block 1704 the cooled natural gas stream and the natural gas stream are combined to generate a combined natural gas stream, and heavy hydrocarbons are removed therefrom to thereby generate a separated natural gas stream. At block 1706 the separated natural gas stream is partially condensed in the first heat exchanger to thereby generate a partially condensed natural gas stream, and liquids are separated therefrom to thereby generate a cold pretreated gas stream and a liquid stream. At block 1708 the cold pretreated gas stream is warmed in the first heat exchanger and then compressed in at least one compressor to a pressure of at least 1,500 psia to form a compressed natural gas stream. At block 1710 the compressed natural gas stream is cooled to form a cooled compressed natural gas stream that is expanded, in at least one work producing natural gas expander, to a pressure that is less than 2,000 psia and no greater than the pressure to which the at least one compressor compresses the pretreated natural gas stream, to thereby form a chilled natural gas stream. At block 1712 the chilled natural gas stream is separated into a refrigerant stream and a non-refrigerant stream, and the refrigerant stream is recycled to exchange heat in the first heat exchanger with one or more process streams comprising at least a portion of the natural gas stream, the separated natural gas stream, and the cold pretreated gas stream, thereby generating a warmed refrigerant stream. At block 1714 the warmed refrigerant stream and the non-refrigerant stream are liquefied to form LNG.

Figure 18:
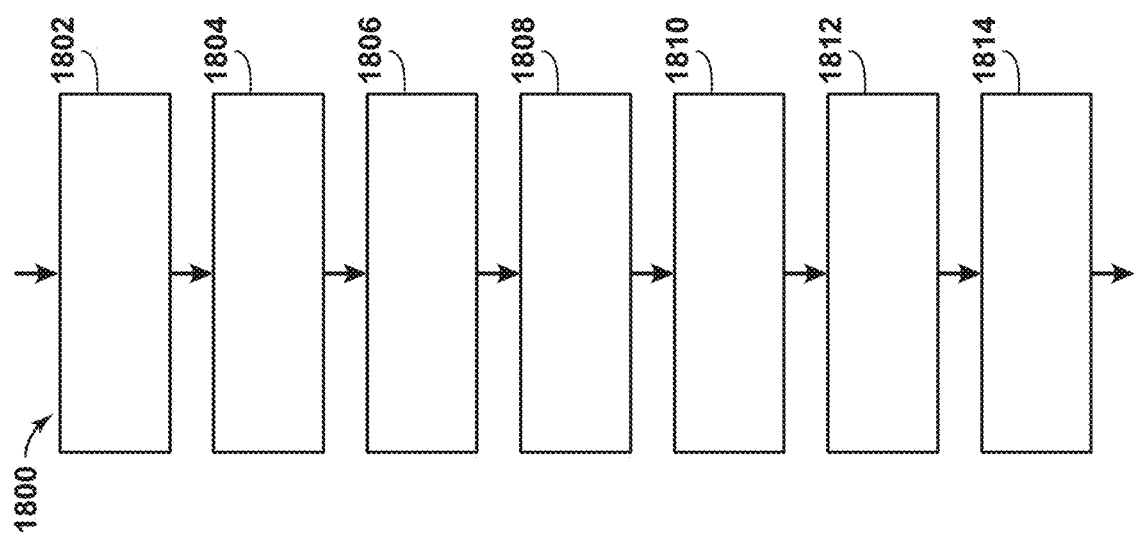
FIG. 18 is a flowchart depicting a method of producing liquefied natural gas according to disclosed aspects.

FIG. 18 is a flowchart depicting a method 1800 of producing liquefied natural gas (LNG) from a natural gas stream according to disclosed aspects. At block 1802 the natural gas stream is cooled in a first heat exchanger to generate a cooled natural gas stream. At block 1804 heavy hydrocarbons are removed from the cooled natural gas stream to thereby generate a separated natural gas stream. At block 1806 the separated natural gas stream is partially condensed in the first heat exchanger to thereby generate a partially condensed natural gas stream, and liquids are separated therefrom to thereby generate a cold pretreated gas stream and a liquid stream. At block 1808 the cold pretreated gas stream is warmed in the first heat exchanger and then compressed in at least one compressor to a pressure of at least 1,500 psia to form a compressed natural gas stream. At block 1810 the compressed natural gas stream is cooled to form a cooled compressed natural gas stream that is expanded, in at least one work producing natural gas expander, to a pressure that is less than 2,000 psia and no greater than the pressure to which the at least one compressor compresses the pretreated natural gas stream, to thereby form a chilled natural gas stream. At block 1812 the chilled natural gas stream is separated into a refrigerant stream and a non-refrigerant stream, and the refrigerant stream is recycled to exchange heat with one or more process streams comprising the natural gas stream, the separated natural gas stream, and the cold pretreated gas stream, thereby generating a warmed refrigerant stream. At block 1814 the warmed refrigerant stream and the non-refrigerant stream are liquefied to form LNG.

Figure 19:
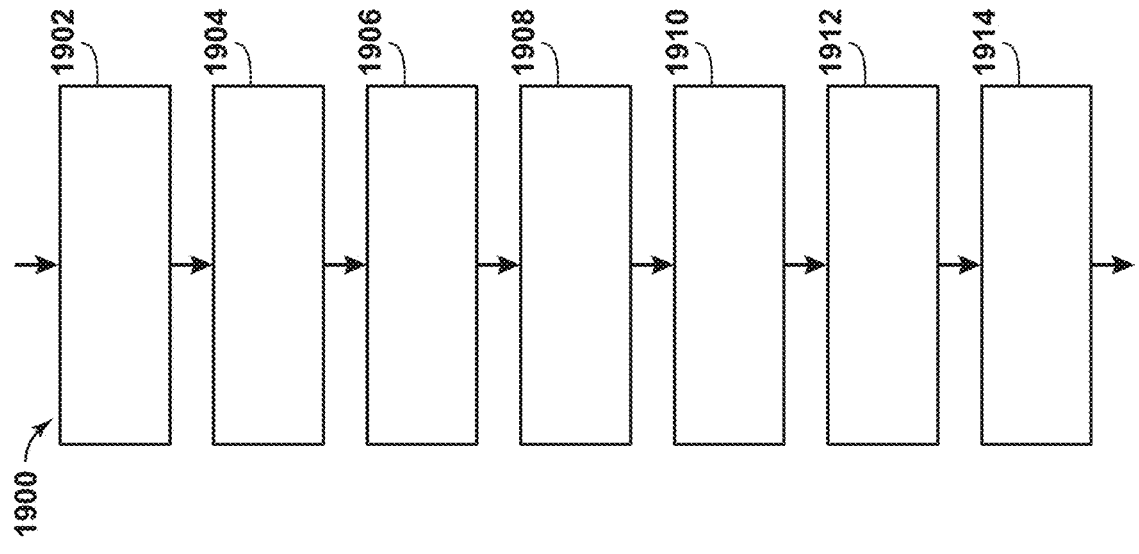
FIG. 19 is a flowchart depicting a method of producing liquefied natural gas according to disclosed aspects.

FIG. 19 is a flowchart depicting a method 1900 of producing liquefied natural gas (LNG) from a natural gas stream according to disclosed aspects. At block 1902 a portion of the natural gas stream is cooled in a first heat exchanger to generate a cooled natural gas stream. At block 1904 the cooled natural gas stream and the natural gas stream are combined to generate a combined natural gas stream, and heavy hydrocarbons are removed therefrom to thereby generate a separated natural gas stream. At block 1906 the separated natural gas stream is partially condensed in the first heat exchanger to thereby generate a partially condensed natural gas stream, and liquids are separated therefrom to thereby generate a cold pretreated gas stream and a liquid stream. At block 1908 the cold pretreated gas stream is warmed in the first heat exchanger and then compressed in at least one compressor to a pressure of at least 1,500 psia to form a compressed natural gas stream. At block 1910 the compressed natural gas stream is cooled to form a cooled compressed natural gas stream that is expanded, in at least one work producing natural gas expander, to a pressure that is less than 2,000 psia and no greater than the pressure to which the at least one compressor compresses the pretreated natural gas stream, to thereby form a chilled natural gas stream. At block 1912 the chilled natural gas stream is recycled through heat exchange with one or more process streams comprising the portion of the natural gas stream, the separated natural gas stream, and the cold pretreated gas stream, thereby generating a warmed refrigerant stream. At block 1914 the warmed refrigerant stream is liquefied to form LNG.

Figure 20:
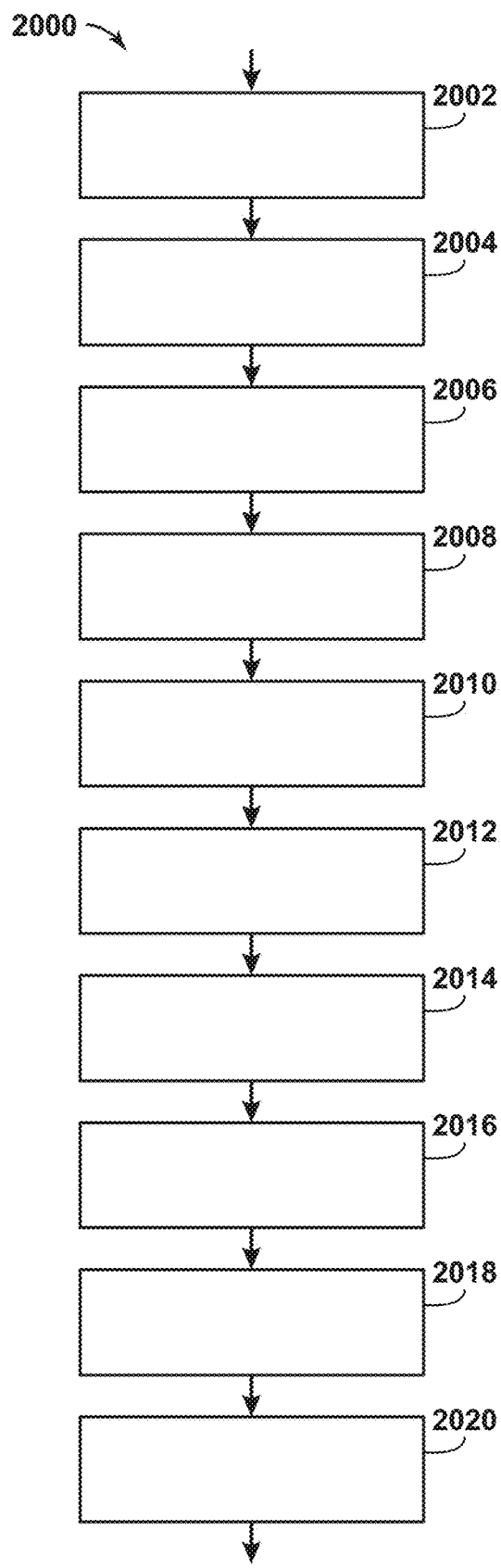
FIG. 20 is a flowchart depicting a method of producing liquefied natural gas according to disclosed aspects.

FIG. 20 is a flowchart showing a method 2000 of producing liquefied natural gas (LNG) from a natural gas stream according to disclosed aspects. At block 2002 a portion of the natural gas stream is cooled in a first heat exchanger to generate a cooled natural gas stream. At block 2004 the cooled natural gas stream and the natural gas stream are combined to generate a combined natural gas stream, and heavy hydrocarbons are removed therefrom in a separator to thereby generate a separated natural gas stream and a separator bottom stream. At block 2006 liquids are separated from the separator bottom stream to form an overhead stream, which is cooled and separated to form a recycle gas stream. At block 2008 the recycle gas stream is compressed in a recycle compressor to form a compressed recycle gas stream. At block 2010 a first portion of the compressed recycle gas stream is directed through the first heat exchanger to form a cooled compressed recycle stream therefrom, and the cooled compressed recycle stream is directed to the separator as a column reflux stream. At block 2012 the separated natural gas stream is used as a coolant in the first heat exchanger to thereby generate a pretreated natural gas stream. At block 2014 a second portion of the compressed recycle gas stream and the pretreated natural gas stream are compressed in at least one compressor to a pressure of at least 1,500 psia to form a compressed natural gas stream, and the compressed natural gas stream is cooled to form a cooled compressed natural gas stream. At block 2016 the cooled compressed natural gas stream is expanded, in at least one work producing natural gas expander, to a pressure that is less than 2,000 psia and no greater than the pressure to which the at least one compressor compresses the pretreated natural gas stream, to thereby form a chilled pretreated gas stream. At block 2018 the chilled pretreated gas stream is recycled to exchange heat with one or more process streams comprising at least a portion of the natural gas stream, the separated natural gas stream, and the first portion of the compressed recycle gas stream, thereby generating a warmed refrigerant stream. At block 2020 the warmed refrigerant stream is liquefied to form LNG.

Figure 21:
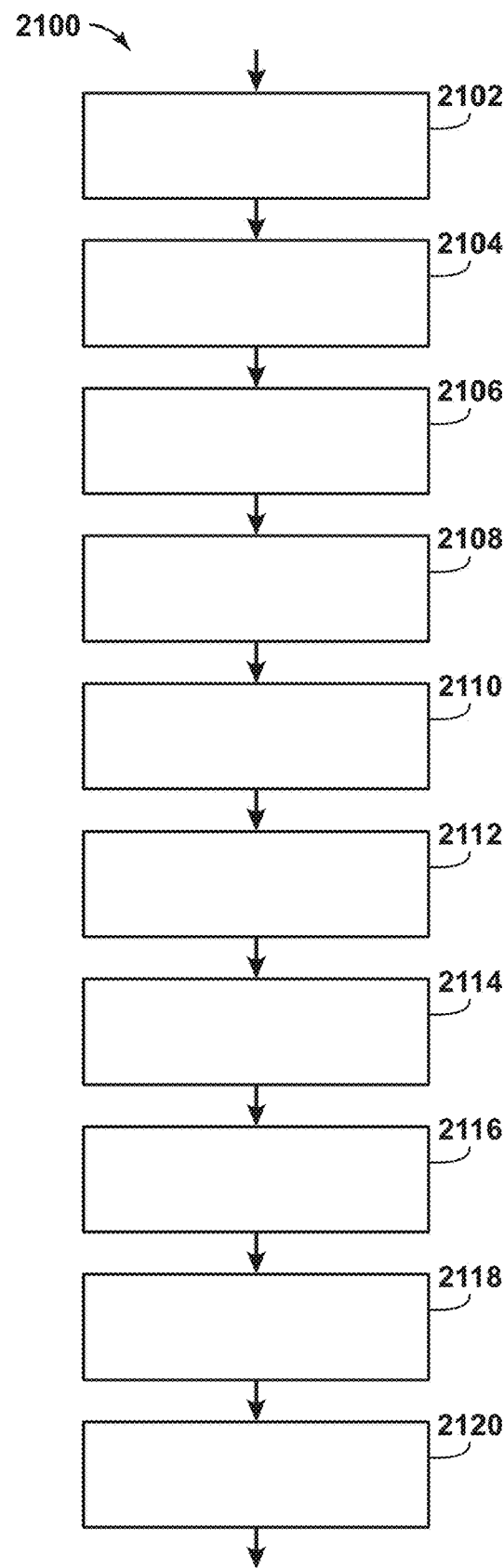
FIG. 21 is a flowchart depicting a method of producing liquefied natural gas according to disclosed aspects.

FIG. 21 is a flowchart depicting a method 2100 of producing liquefied natural gas (LNG) from a natural gas stream according to disclosed aspects. At block 2102 a portion of the natural gas stream is cooled in a first heat exchanger to generate a cooled natural gas stream. At block 2104 the cooled natural gas stream and the natural gas stream are combined to generate a combined natural gas stream, and heavy hydrocarbons are removed therefrom in a separator to thereby generate a separated natural gas stream and a separator bottom stream. At block 2106 liquids are separated from the separator bottom stream to form an overhead stream, which is cooled and separated to form a recycle gas stream. At block 2108 the recycle gas stream is compressed in a recycle compressor to form a compressed recycle gas stream. At block 2110 a first portion of the compressed recycle gas stream is directed through the first heat exchanger to form a cooled compressed recycle stream therefrom, and the cooled compressed recycle stream is directed to the separator as a column reflux stream. At block 2112 a pressure and a temperature of the separated natural gas stream are reduced in a pressure reducing device, and the separated natural gas stream is then used as a coolant in the first heat exchanger to thereby generate a pretreated natural gas stream. At block 2114 a second portion of the compressed recycle gas stream and the pretreated natural gas stream are compressed in a feed compressor to a pressure of at least 1,500 psia to form a compressed natural gas stream, which is cooled to form a cooled high pressure gas stream. At block 2116 the cooled high pressure gas stream is liquefied to form LNG.

While the foregoing is directed to aspects of the present disclosure, other and further aspects of the disclosure may be devised without departing from the basic scope thereof, and the scope thereof is determined by the claims that follow.

What is claimed is:

1. A method of producing liquefied natural gas (LNG) from a natural gas stream, the method comprising:
   cooling a first portion of the natural gas stream in a first heat exchanger to generate a cooled natural gas stream;
   combining the cooled natural gas stream with a second portion of the natural gas stream that has not been cooled to generate a combined natural gas stream;
   removing heavy hydrocarbons from the combined natural gas stream to generate a separated natural gas stream;
   partially condensing the separated natural gas stream in the first heat exchanger to generate a partially condensed natural gas stream;
   separating liquids from the partially condensed natural gas stream to generate a cold pretreated gas stream and a liquid stream;
   warming the cold pretreated gas stream in the first heat exchanger to generate a pretreated natural gas stream;
   compressing the pretreated natural gas stream in at least one compressor to a pressure of at least 1,500 psia to form a compressed natural gas stream;
   cooling the compressed natural gas stream to form a cooled compressed natural gas stream;
   expanding, in at least one work-producing natural gas expander, the cooled compressed natural gas stream to a pressure that is less than 2,000 psia and no greater than the pressure to which the at least one compressor compresses the pretreated natural gas stream to form a chilled natural gas stream;

separating the chilled natural gas stream into a refrigerant stream and a non-refrigerant stream;

recycling the refrigerant stream to exchange heat in the first heat exchanger with one or more process streams comprising at least the first portion of the natural gas stream, the separated natural gas stream, and the cold pretreated gas stream to generate a warmed refrigerant stream;

combining the warmed refrigerant stream and the non-refrigerant stream to form a chilled pretreated gas stream; and liquefying the chilled pretreated natural gas stream to form LNG.

2. The method of claim 1, wherein the heavy hydrocarbons are separated from the combined natural gas stream in a scrub column, the method further comprising:

directing the liquid stream to the scrub column as a column reflux stream.

3. The method of claim 2, further comprising:
extracting liquids from the scrub column;
heating the liquids in a reboiler to generate a stripping gas; and
inserting the stripping gas into a lower portion of the scrub column.

4. The method of claim 1, wherein the at least one compressor compresses the pretreated natural gas stream to a pressure greater than 3,000 psia.

5. The method of claim 1, wherein the at least one compressor comprises at least two serially arranged compressors, and wherein one of the at least two serially arranged compressors is driven by the at least one work-producing natural gas expander.

6. The method of claim 1, further comprising:
reducing a pressure and a temperature of a portion of the refrigerant stream, to produce a further cooled refrigerant stream;
directing the further cooled refrigerant stream through the first heat exchanger to cool the one or more process streams, thereby producing a warmed side stream; and
combining the warmed side stream with the pretreated natural gas stream.

7. An apparatus for liquefaction of a natural gas stream, comprising:
a first heat exchanger that cools a first portion of the natural gas stream to generate a cooled natural gas stream;
a first separation device configured to remove heavy hydrocarbons from a combined natural gas stream comprising the cooled natural gas stream and a second portion of the natural gas stream that has not been cooled to generate a separated natural gas stream, wherein the first heat exchanger receives and partially condenses the separated natural gas stream to form a partially condensed natural gas stream;
a second separation device that separates liquids from the partially condensed natural gas stream to generate a cold pretreated gas stream and a liquid stream, wherein the cold pretreated gas stream is warmed in the first heat exchanger to generate a pretreated natural gas stream;
at least one compressor configured to compress the pretreated natural gas stream to a pressure greater than 1,500 psia to form a compressed natural gas stream;
an air cooled or water cooled heat exchanger that cools the compressed natural gas stream to form a cooled compressed natural gas stream;
at least one work-producing expander configured to expand the cooled compressed natural gas stream to a pressure which is less than 2,000 psia and is no greater than the pressure to which the at least one compressor compresses the pretreated natural gas stream to form a chilled natural gas stream;

wherein the chilled natural gas stream is separated into a refrigerant stream and a non-refrigerant stream, and wherein the refrigerant stream is recycled to exchange heat in the first heat exchanger with one or more process streams comprising at least the first portion of the natural gas stream, the separated natural gas stream, and the cold pretreated natural gas stream to generate a warmed refrigerant stream, and wherein the warmed refrigerant stream and the pretreated natural gas stream are combined to form a chilled pretreated gas stream; and at least one liquefaction unit configured to liquefy the chilled pretreated gas stream.

8. The apparatus of claim 7, wherein the first separation device is a scrub column, and wherein the liquids stream is directed to the scrub column as a column reflux stream.

9. The apparatus of claim 7, wherein the at least one compressor comprises at least two serially arranged compressors, and wherein one of the at least two serially arranged compressors is driven by the at least one work-producing expander.

10. The apparatus of claim 7, further comprising:
a device for reducing a temperature and a pressure of a portion of the refrigerant stream, the device producing a further cooled refrigerant stream that is directed through the first heat exchanger to cool the one or more process streams, thereby producing a warmed side stream;
wherein the warmed side stream is combined with the pretreated natural gas stream.

11. The method of claim 1, further comprising reducing a pressure of the refrigerant stream.

* * * * *